United States Patent
Berezhnyy et al.

(10) Patent No.: US 12,222,277 B2
(45) Date of Patent: Feb. 11, 2025

(54) FLOW CYTOMETERS INCLUDING LASER ASSESSORS, AND METHODS FOR USING THE SAME

(71) Applicant: Becton, Dickinson and Company, Franklin Lakes, NJ (US)

(72) Inventors: Ihor Berezhnyy, Los Gatos, CA (US); Svitlana Berezhna, Los Gatos, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 242 days.

(21) Appl. No.: 17/240,429

(22) Filed: Apr. 26, 2021

(65) Prior Publication Data

US 2021/0341380 A1   Nov. 4, 2021

Related U.S. Application Data

(60) Provisional application No. 63/019,569, filed on May 4, 2020.

(51) Int. Cl.
*G01N 15/14* (2024.01)
*G01N 15/02* (2024.01)
(Continued)

(52) U.S. Cl.
CPC ......... *G01N 15/1436* (2013.01); *G01N 15/02* (2013.01); *G01N 15/1404* (2013.01);
(Continued)

(58) Field of Classification Search
None
See application file for complete search history.

(56) References Cited

U.S. PATENT DOCUMENTS 3,451,755 A * 6/1969 Parrent, Jr. ............ G02B 27/46
  356/336
4,243,318 A * 1/1981 Stohr ................. G01N 15/1427
  356/73

(Continued)

FOREIGN PATENT DOCUMENTS

WO   WO2021096658   5/2021
WO   WO2021101692   5/2021

OTHER PUBLICATIONS

Giesecke, et al. "Determination of Background, Signal-to-Noise, and Dynamic Range of a Flow Cytometer: A Novel Practical Method for Instrument Characterization and Standardization", Cytometry Part A 91A: 11041114, 2017.

(Continued)

*Primary Examiner* — Neil N Turk
(74) *Attorney, Agent, or Firm* — Peter W. Schroen; Bret E. Field; BOZICEVIC, FIELD & FRANCIS LLP

(57) ABSTRACT

Aspects of the present disclosure include flow cytometers configured to compensate for optical noise caused by operational change of a laser. Flow cytometers according to certain embodiments include a laser assessor configured to assess operational change of a laser. In embodiments, the laser assessor includes a reference detector and a mirror positioned between the reference detector and the flow cell that is configured to reflect forward scattered light to a forward scatter detector and allow non-scattered laser light to pass through to the reference detector. Methods for assessing laser functionality and, where desired, dynamically adjusting flow cytometer data, based on laser reference data from the laser assessor are also provided.

11 Claims, 11 Drawing Sheets

(51) Int. Cl.
*G01N 15/1404* (2024.01)
*G01N 15/1434* (2024.01)
*G01N 21/64* (2006.01)
*G01N 33/48* (2006.01)

(52) U.S. Cl.
CPC ..... *G01N 15/1459* (2013.01); *G01N 21/6428* (2013.01); *G01N 2015/1402* (2013.01); *G01N 2201/06113* (2013.01); *G01N 2223/412* (2013.01)

(56) References Cited

U.S. PATENT DOCUMENTS

| | | | | |
|---|---|---|---|---|
| 4,482,247 | A * | 11/1984 | Meltz | G01N 21/53 356/343 |
| 4,586,190 | A * | 4/1986 | Tsuji | G01N 33/48 377/10 |
| 4,643,566 | A * | 2/1987 | Ohe | G01N 15/1459 356/615 |
| 4,988,630 | A * | 1/1991 | Chen | G01N 33/543 13 435/7.1 |
| 5,515,163 | A * | 5/1996 | Kupershmidt | G01N 15/0205 356/369 |
| 5,719,667 | A * | 2/1998 | Miers | G01N 15/1436 356/73 |
| 5,844,685 | A | 12/1998 | Gontin | |
| 6,016,194 | A * | 1/2000 | Girvin | G01N 15/1425 356/336 |
| 6,191,853 | B1 * | 2/2001 | Yamaguchi | G01N 15/02 356/336 |
| 6,592,822 | B1 * | 7/2003 | Chandler | G01N 15/1456 356/73 |
| 2008/0108146 | A1 * | 5/2008 | Jiang | G01N 15/1012 436/172 |
| 2014/0093949 | A1 * | 4/2014 | Norton | G01N 15/1459 422/69 |
| 2020/0025665 | A1 * | 1/2020 | Trainer | G01N 21/53 |

OTHER PUBLICATIONS

Steen "Noise, Sensitivity, and Resolution of Flow Cytometers", Cytometry 13:822-830 (1992).

Steen "Evaluation of Present and Potential Performance of Flow Cytometry", Chemistry, 8 pages 1994.

Steen, et al. "Pulse Modulation of the Excitation Light Source Boosts the Sensitivity of an Arc Lamp-Based Flow Cytometer", Cytometry 14: 15-122 (1993).

Steinkamp "A differential amplifier circuit for reducing noise in axial light loss measurements", Cytometry. Jul. 1983; 4(1):83-7.

* cited by examiner

FLOW CYTOMETERS INCLUDING LASER ASSESSORS, AND METHODS FOR USING THE SAME

CROSS-REFERENCE

Pursuant to 35 U.S.C. § 119 (e), this application claims priority to the filing date of U.S. Provisional Patent Application Ser. No. 63/019,569 filed May 4, 2020, the disclosure of which application is incorporated herein by reference in its entirety.

INTRODUCTION

The characterization of analytes in biological fluids has become an important part of medical diagnoses and assessments of overall health and wellness of a patient. Detecting analytes in biological fluids, such as human blood or blood derived products, can provide results that may play a role in determining a treatment protocol of a patient having a variety of disease conditions.

Flow cytometry is a technique used to characterize and often times sort biological material, such as cells of a blood sample or particles of interest in another type of biological or chemical sample. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. To characterize the components of the flow stream, the flow stream is irradiated with light. Variations in the materials in the flow stream, such as morphologies or the presence of fluorescent labels, may cause variations in the observed light and these variations allow for characterization and separation.

To characterize the components in the flow stream, light must impinge on the flow stream and be collected. The light source is aligned with the flow stream and an optical response from the illuminated particles is collected and quantified. In practice, however, the intensity of light that illuminates the particles may be varied. Light emission and detection is a stochastic process. Indeed, emitted photons undergo temporal fluctuations due to factors such as changes in temperature, pressure and humidity. For example, FIG. 1, demonstrates how much laser intensity fluctuates over a 1 second time period. Such fluctuations create optical noise and drift in the collected flow cytometer data, since typical flow cytometers are unable to discern whether certain features of collected light result from interactions with particles in the flow cell or unintended changes in light intensity. FIG. 2 illustrates flow cytometer data 201, as well as the noise 203 and drift 202 contained therein. For example, if excitation light intensity fluctuates during data acquisition, this will produce variations in the fluorescent and scattered signals. Accordingly, noise produced by fluctuations in light intensity is a limiting factor in attempts to improve flow cytometer resolution.

FIG. 3 provides a schematic depiction of how particle-modulated light is diverted to different light paths in typical flow cytometers. Laser light irradiating a particle in a flow cell 325 produces multiple channels of light. Light scattered in the forward direction (i.e., forward scattered light) passes through a lens 330 and pinhole 323 before it is directed to a forward scatter detector 311. A light blocking element 316 (i.e., obfuscation bar) is positioned within the forward scattered light path such that non-scattered laser light (i.e., laser light that is not scattered by particles in a flow cell after passing therethrough) is blocked from detection. Light scattered to the side (i.e., side scattered light) and fluorescent light pass through a pinhole 32 before being separated into different channels by mirrors 345a-345d. Side scattered light is directed to a side scatter detector 335, while different wavelengths of fluorescent light are directed to respective fluorescent light detectors 360a-360d.

FIG. 4 provides an alternative schematic depiction of a conventional flow cytometer. Light emanating from a laser 415 irradiates a particle in a flow cell 425 and produces multiple channels of light. Forward scattered light passes through a filter 450d before it is directed to a forward scatter detector 411. A light blocking element 416 (i.e., obstruction bar) is positioned within the forward scattered light path such that non-scattered laser light is blocked from detection. Side scattered light and fluorescent light pass through a filter 450f before being separated into different channels by mirrors 445a-445c. Side scattered light is directed to a side scatter detector 435, while different wavelengths of fluorescent light are directed to respective fluorescent light detectors 460a-460c after passing through bandpass filters 450a-450c. Data from the detectors 460a-460c and 411 is received by a signal processor, which then outputs the data to a computer 480 containing acquisition software 490 thereon.

FIG. 5 Is a schematic depiction of light being scattered by particles at the interrogation point of a flow cell in a typical flow cytometer. When laser light passes through a particle in the flow cell 500, light of various wavelengths is produced. Forward scattered light 504 is scattered in the forward direction and side scattered light 503 is scattered to the side. Particles that have been excited by the laser emit fluorescent light 506. In addition, some amount of light is not modulated by the particles and continues along the original optical axis established by the laser. In most conventional flow cytometers, this direct beam of light 505 (i.e., non-scattered laser light) is blocked by one of various beam stop elements 510 (e.g., beam bar, disk, density filter, absorber).

SUMMARY

Aspects of the invention include flow cytometer laser assessors configured to compensate for optical noise caused by operational change of a laser. In embodiments, flow cytometers include a laser assessor configured to provide for dynamic assessment of operational change of a flow cytometer laser. In certain instances, the laser assessor includes a reference detector (e.g., a photomultiplier tube) configured to detect non-scattered laser light (i.e., direct laser light or light received directly from a laser) that is not scattered by particles in the flow cell after passing therethrough and produce a reference signal in response thereto. The resultant reference signal may be used to dynamically assess laser functionality and, where desired, adjust flow cytometry data obtained by the flow cytometer (e.g., to account for changes in laser operation).

In embodiments, the laser assessor includes a non-scattered light selection element positioned between the flow cell and the reference detector. In some instances, the non-scattered light selection element is a mirror configured to reflect forward scattered light to a forward scattered light detector and includes a passage (e.g., hole or optically transparent window) through which non-scattered laser light can reach the reference detector. In some embodiments, the passage is substantially circular in shape. In certain embodiments, one or more bandpass filters is located between the mirror and the reference detector. In some embodiments, one or more bandpass filters are placed between the mirror and the forward scatter detector. In other embodiments, the mirror is a dichroic mirror and only reflects light of certain wavelengths to the forward scatter detector.

Aspects of the invention also include flow cytometers including laser assessors, e.g., as described above. Flow cytometers according to embodiments of the invention also include detectors configured to detect particle-modulated light (e.g., scattered light produced by a particle passing through a laser at an interrogation point in a flow cell, e.g., fluorescent light, light emitted by a particle after passing through a laser at an interrogation point in a flow cell, etc.). For example, flow cytometers of interest may include one or more side scatter detectors configured to detect side scattered light from the flow cell, as well as one or more fluorescent light detectors configured to detect fluorescent light from the flow cell. In embodiments, flow cytometers may also include one or more optical adjustment components including, but not limited to, lenses, mirrors, filters, fiber optics, wavelength separators, pinholes, slits, collimating protocols and combinations thereof that can be arranged as desired.

Also provided are methods of assessing functionality of flow cytometer lasers. Aspects of such methods include introducing a sample into a flow cytometer that includes a laser, a flow cell, and a laser assessor configured to assess operational change of the laser, and, where desired, dynamically adjust flow cytometer data. Laser assessors of interest for the subject methods include a non-scattered light selection element positioned between the flow cell and the reference detector. In some instances, the non-scattered light selection element includes a mirror configured to reflect forward scattered light to a forward scattered light detector and includes a passage through which non-scattered laser light can reach the reference detector. In embodiments, methods include receiving a reference signal produced by the reference detector after it has been illuminated by non-scattered laser light. In some embodiments, the reference signal is used to calculate parameters characterizing the functionality of the laser, such as change in light intensity over time. In certain embodiments, these parameters can be outputted to a user.

Methods according to the disclosure also include dynamically adjusting the flow cytometer data based on the laser reference data. In some embodiments, methods include receiving flow cytometer data from one or more detectors and laser reference data from the laser assessor. In embodiments, flow cytometer data includes scattered light derived information regarding properties of particles in the flow cell (e.g., particle properties parameter) which include, but are not limited to, refractive index and diameter. In embodiments, flow cytometer data includes fluorescent light derived information regarding emissions from fluorescent molecules associated with the particles in the flow cell. In certain embodiments, dynamically adjusting flow cytometer data includes compensating for optical noise caused by operational change of the laser. In embodiments, compensating for optical noise includes associating operational change of the laser with operational change of the particle modulated light, i.e., identifying that a fluctuation in particle modulated light intensity is a result of a fluctuation in laser light intensity. For example, where the flow cytometry data is forward scattered data, dynamically adjusting incudes associating said operational change of the laser with the resulting operational change of the forward scattered light. Where the flow cytometry data is side scattered data, dynamically adjusting incudes associating said operational change with the resulting operational change of the side scattered light. Where the flow cytometry data is fluorescent data, dynamically adjusting incudes associating said operational change with the resulting operational change of the fluorescent light. In embodiments, methods include adjusting a particle properties parameter according to the ratio of the intensity of the forward scattered light and the intensity of the laser light. In some embodiments, methods include adjusting fluorescent light data according to the ratio of the intensity of the fluorescent light and the intensity of the laser light. In some embodiments, methods include adjusting side scattered light data according to the ratio of the intensity of the side scattered light and the intensity of the laser light.

Flow cytometers of interest also include logic, e.g., software and/or hardware, such as a processor having memory operably coupled to the processor, where the memory includes instructions stored thereon, which when executed by the processor, cause the processor to provide an assessment of laser functionality and, where desired, dynamically adjust flow cytometer data. In embodiments, flow cytometer data includes scattered light derived information regarding properties of particles in the flow cell (e.g., particle properties parameter) which include, but are not limited to, refractive index and diameter. In embodiments, flow cytometer data includes fluorescent light derived information regarding emissions from fluorescent molecules associated with the particles in the flow cell. In some embodiments, the memory includes instructions for receiving flow cytometer data from one or more detectors (e.g., forward scatter detector, side scatter detector, fluorescent detector), and laser reference data from a laser assessor configured to dynamically assess operational change of a laser during use. In some embodiments, the memory includes instructions for dynamically adjusting the flow cytometer data based on the laser reference data. In some embodiments, dynamically adjusting flow cytometer data includes compensating for optical noise caused by operational change of the laser. In embodiments, compensating for optical noise includes associating operational change of the laser with operational change of the particle modulated light, i.e., identifying that a fluctuation in particle modulated light intensity is a result of a fluctuation in laser light intensity. For example, where the flow cytometry data is forward scattered data, dynamically adjusting incudes associating said operational change of the laser with the resulting operational change of the forward scattered light. Where the flow cytometry data is side scattered data, dynamically adjusting incudes associating said operational change with the resulting operational change of the side scattered light. Where the flow cytometry data is fluorescent data, dynamically adjusting incudes associating said operational change with the resulting operational change of the fluorescent light. In embodiments, the memory includes instructions for adjusting a particle properties parameter according to the ratio of the intensity of the forward scattered light and the intensity of the laser light. In some embodiments, the memory includes instructions for adjusting fluorescent light data according to the ratio of the intensity of the fluorescent light and the intensity of the laser light. In some embodiments, the memory includes instructions for adjusting side scattered light data according to the ratio of the intensity of the side scattered light and the intensity of the laser light.

Aspects of the present disclosure also include non-transitory computer readable storage media. In some embodiments, computer readable storage media of interest include a computer program stored thereon, where the computer program when loaded on the computer includes instructions having an algorithm for dynamically adjusting flow cytometer data based on laser reference data. In some embodiments, the computer readable storage medium includes algorithm for receiving flow cytometer data from one or more detectors and laser reference data from a laser assessor configured to dynamically assess operational change of a laser during use. In embodiments, flow cytometer data includes scattered light derived information regarding properties of particles in the flow cell (e.g., particle properties parameter) which include, but are not limited to, refractive index and diameter. In embodiments, flow cytometer data includes fluorescent light derived information regarding emissions from fluorescent molecules associated with the particles in the flow cell. In embodiments, computer readable storage medium includes algorithm for dynamically adjusting the flow cytometer data based on the laser reference data. In some embodiments, dynamically adjusting flow cytometer data includes compensating for optical noise caused by operational change of the laser by associating said operational change with the resulting operational change of the forward scattered light. In embodiments, the algorithm compensates for optical noise by associating operational change of the laser with operational change of the particle modulated light, i.e., identifying that a fluctuation in particle modulated light intensity is a result of a fluctuation in laser light intensity. For example, where the flow cytometry data is forward scattered data, the algorithm associates said operational change of the laser with the resulting operational change of the forward scattered light. Where the flow cytometry data is side scattered data, the algorithm associates said operational change with the resulting operational change of the side scattered light. Where the flow cytometry data is fluorescent data, the algorithm associates said operational change with the resulting operational change of the fluorescent light. In some embodiments, the non-transitory computer readable storage medium includes algorithm for adjusting a particle properties parameter according to the ratio of the intensity of the forward scattered light and the intensity of the laser light.

BRIEF DESCRIPTION OF THE FIGURES

The invention may be best understood from the following detailed description when read in conjunction with the accompanying drawings. Included in the drawings are the following figures.

DETAILED DESCRIPTION

Figure 1:
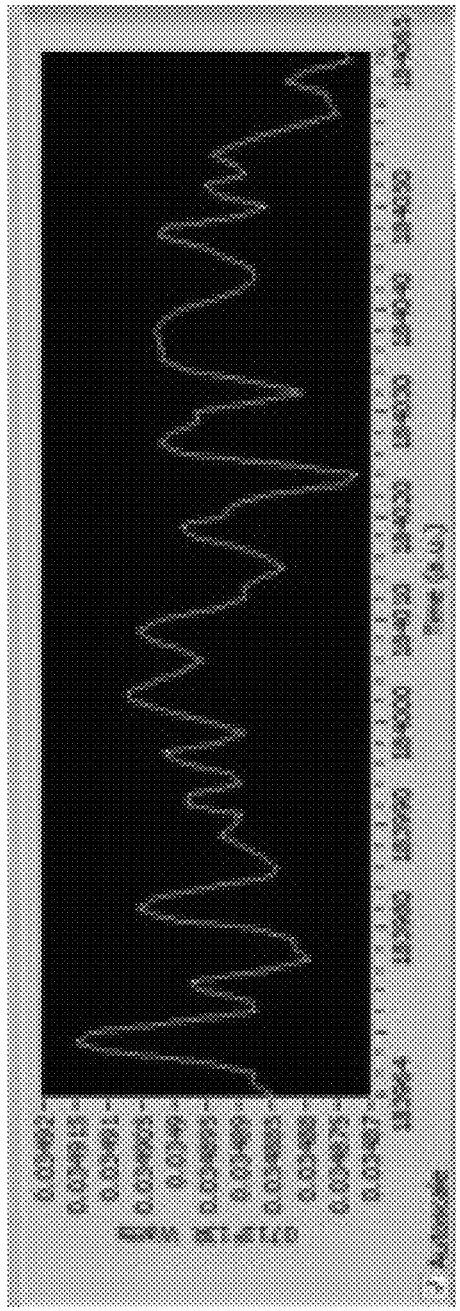
FIG. 1 depicts a power meter interface demonstrating operational change of a laser over a 1 second period.

Laser assessors configured to assess and compensate for operational change of a laser during use are provided. According to certain embodiments, the laser assessor includes a reference detector, and a non-scattered light selection element positioned between the reference detector and the flow cell. In embodiments, the non-scattered light selection element includes a mirror that allows passage of laser light directly to the reference detector and reflects forward scattered light to a forward scattered light detector. Flow cytometers including laser assessors are also provided. Aspects of the flow cytometers include a flow cell, a laser, and a laser assessor configured to dynamically assess operational change of the laser. Also provided are methods for assessing laser functionality and, where desired, dynamically adjusting flow cytometer data based on laser reference data from a laser assessor. Non-transitory computer readable storage media having instructions stored thereon for assessing laser functionality and, optionally, dynamically adjusting flow cytometer data based on laser reference data from a laser assessor are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

Flow Cytometer Laser Assessors

Figure 2:
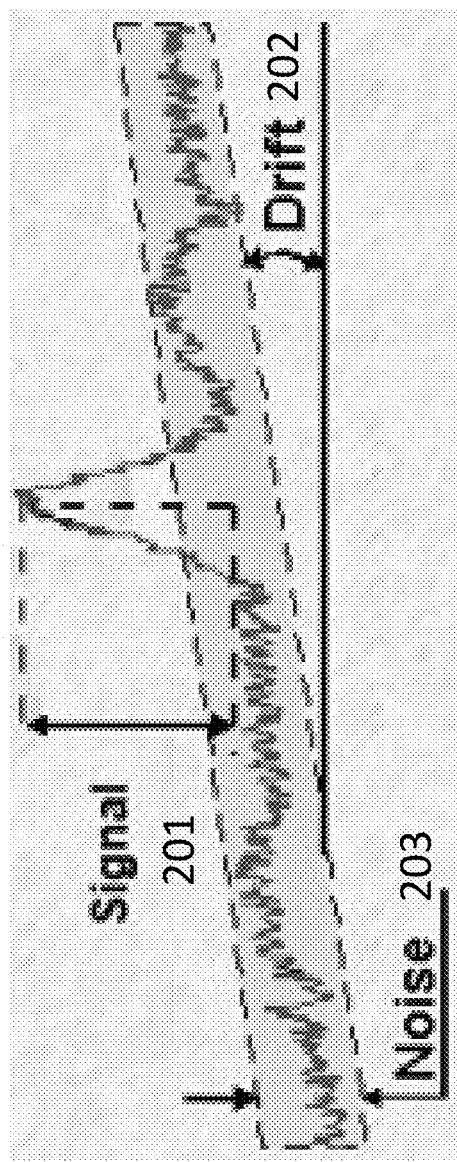
FIG. 2 depicts noise and drift in a detection channel of a flow cytometer.

As reviewed above, flow cytometer laser assessors are provided. According to embodiments, laser assessors are configured to assess the operational change of the laser during use. By "operational change" is meant a change in functionality of the laser. The change in functionality may manifest in a number of different ways, including but not limited to: change in light intensity over time, change from continuous to discontinuous, etc. Where the operational change is a change in intensity over time, the magnitude of change may vary, ranging in some instances from 0.02% to 2%, such as 0.2% to 2%, including 0.2 to 1%, over a period of time ranging from 1 µsec to 10 hours, such as 1 sec to 10 hour, including 1 min to 1 hour, where in some instances the period of time ranges from 1 µsec to 10 µsec, or 1 sec to 1 min, or 10 min to 10 hour. Causes of operational change in the laser include, but are not limited to, laser electronics thermal drift, laser pointing stability drift, thermal expansion coefficients optical mismatch drift, changes in pressure, and changes in humidity. The operational change of the laser, when not properly identified as such, impedes a flow cytometer's ability to ascertain parameters of particles in a flow cell with high resolution because optical noise and drift are introduced into the collected flow cytometer data. By "noise" it is meant irrelevant and compromised signals in flow cytometry data resulting from operational change in the laser (i.e., changes in laser light intensity). "Drift", on the other hand, is described as a long-term variation in laser light power (see e.g., FIG. 2 and the accompanying description thereof in the introduction section).

According to certain embodiments, laser assessors are configured to assess the operational change of a laser of a flow cytometer. By "assessing" operational change of the laser, it is meant evaluating the functionality of the laser and determining characteristics of the laser light emanating therefrom. In some embodiments, assessing operational change of the laser includes ascertaining laser light intensity over a period of time. In further embodiments, assessing operational change of the laser includes detecting fluctuations in laser light intensity resulting from, e.g., factors such as changes in temperature, pressure and humidity. In embodiments, assessing operational change of a laser can include measuring laser light continuously. In other embodiments, assessing operational change of a laser can include measuring laser light in discrete intervals.

As described above in the introduction section, laser light irradiating particles in a flow cell produces multiple channels of light (e.g., forward scatter, side scatter, fluorescent). In addition, some laser light is not scattered or otherwise modulated by passing through the interrogation point of a flow cell (i.e., non-scattered light) and continues along the same optical axis of light established by the laser (i.e., in the forward direction). According to certain embodiments, laser assessors are configured to assess the operational change of a laser of a flow cytometer by selectively detecting non-scattered light, i.e., laser light that is not modulated by particles in a flow cell after passing therethrough. In embodiments, selectively detecting non-scattered light includes preventing channels of particle-modulated light (e.g., forward scattered light) from being detected with the non-scattered light.

In embodiments, selectively detecting non-scattered light includes allowing the non-scattered light to illuminate a detector (i.e., reference detector) configured to produce a signal in response thereto (i.e., reference signal). In embodiments, the reference signal is used to assess the operational change of the laser. A "reference signal" as described herein may include information about laser functionality, such as, for instance, laser light intensity and fluctuations therein. In some embodiments, the reference signal may be used to calculate values for parameters of the laser such as laser intensity and changes in laser intensity, which values may be outputted to a user.

Any convenient detector for detecting collected light may be used in the reference detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$. In some embodiments, flow cytometers include multiple reference detectors, such as 1 or more, 2 or more, 3 or more, 4 or more, and including 5 or more.

In embodiments, the reference detector is configured to measure light continuously or in discrete intervals. In some instances, the reference detector is configured to take measurements of the collected light continuously. In other instances, the reference detector is configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Figure 3:
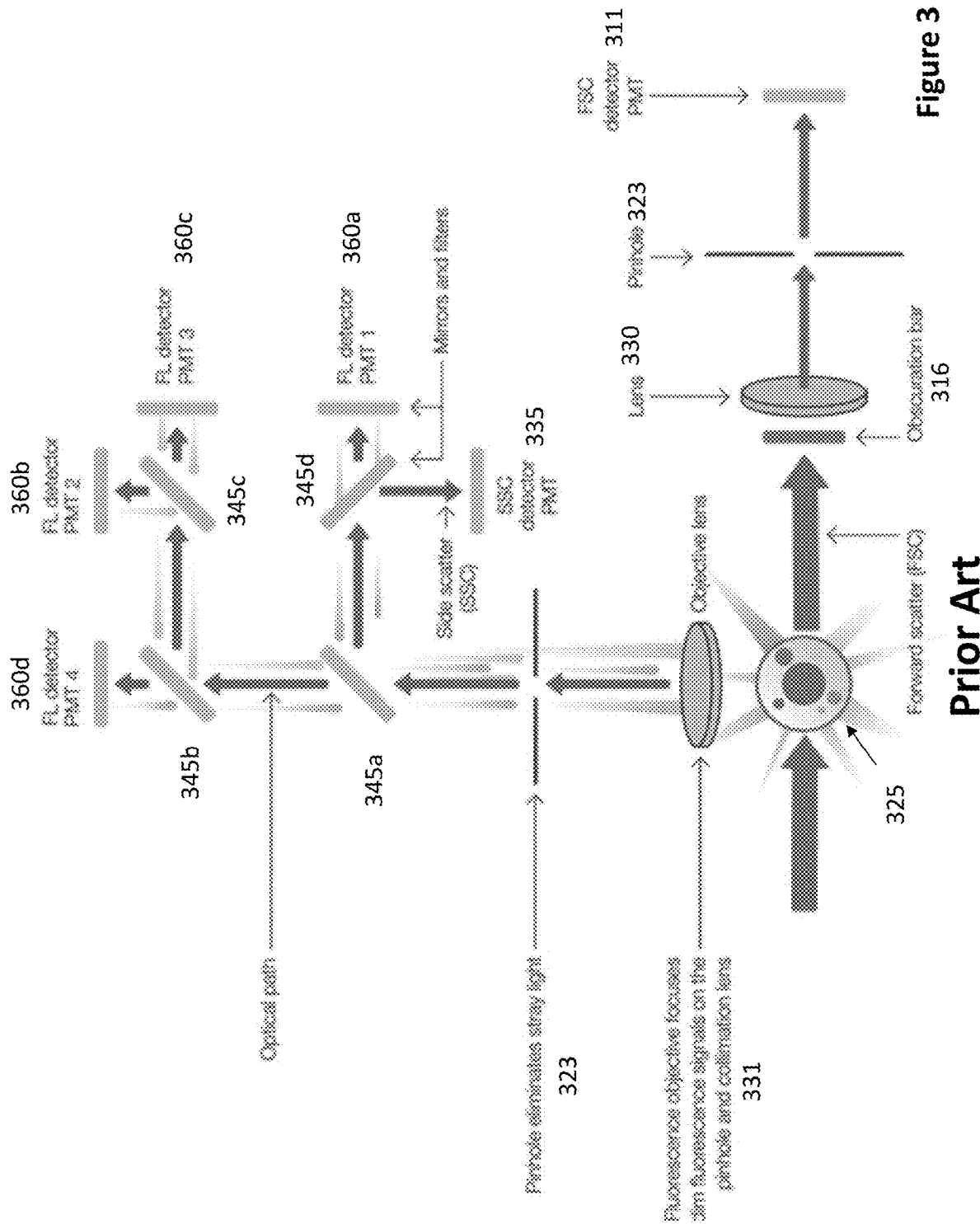
FIG. 3 depicts a two-dimensional schematic drawing of light paths in conventional flow cytometers.
Figure 4:
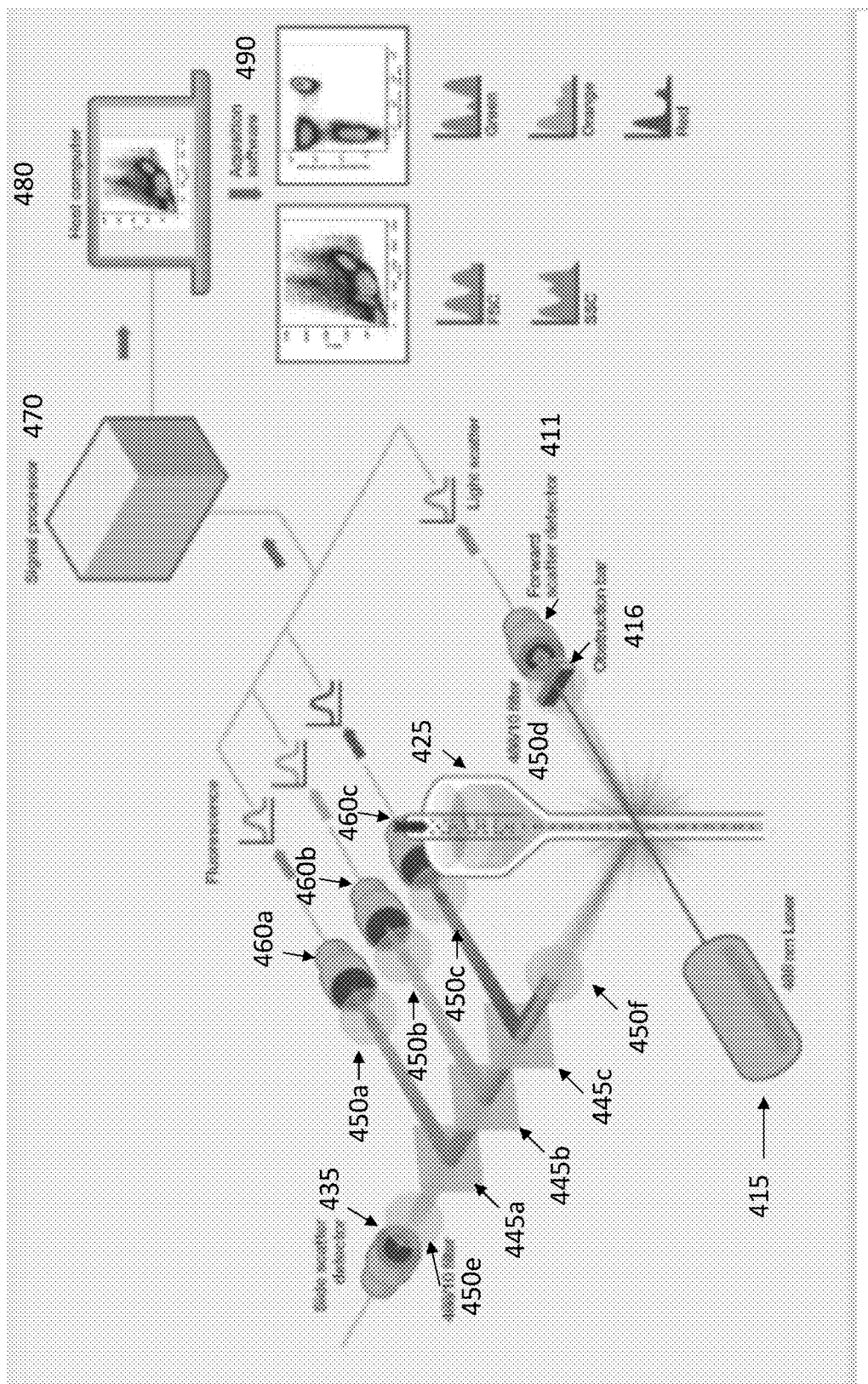
FIG. 4 depicts a three-dimensional schematic drawing of light paths in conventional flow cytometers.
Figure 5:
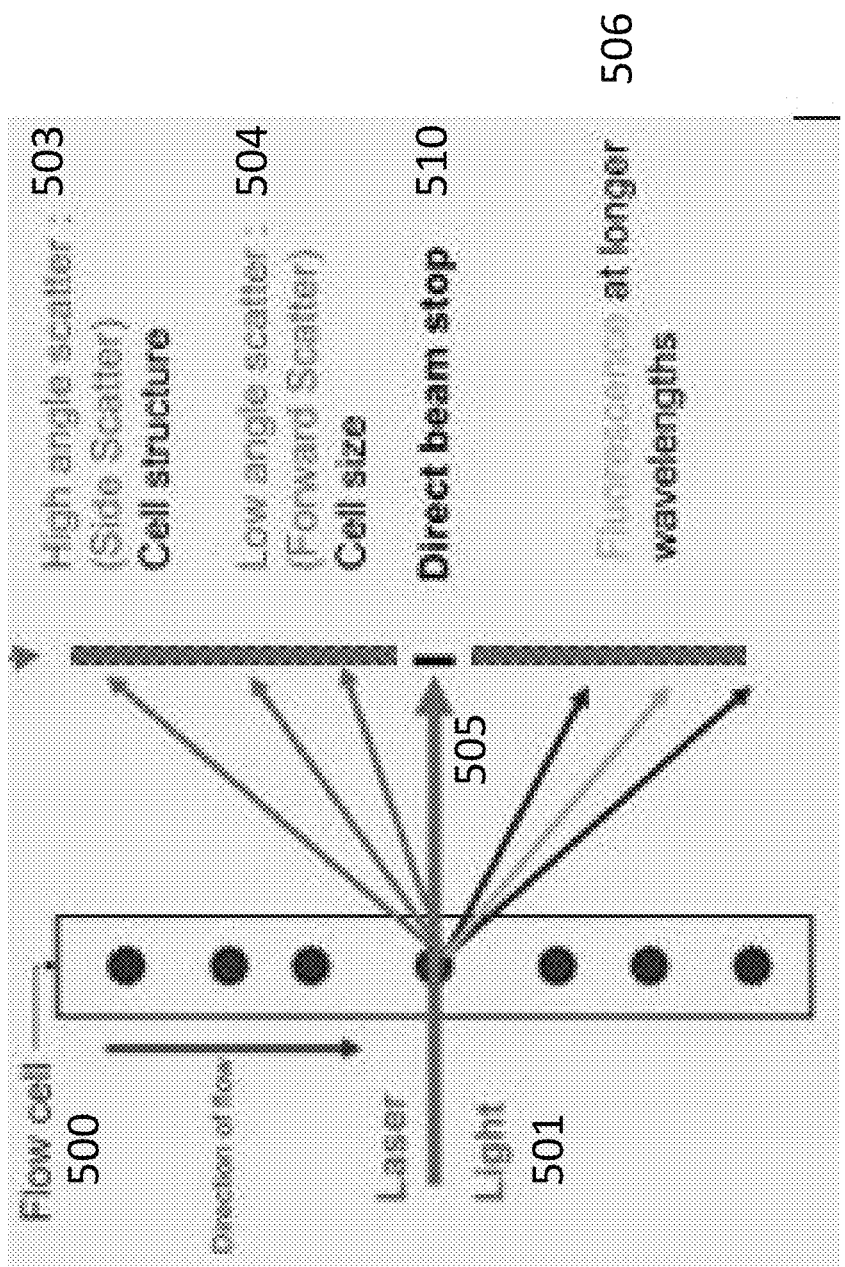
FIG. 5 depicts a schematic drawing of laser light being scattered by particles in a flow cell.

In certain embodiments, the laser assessor further includes a non-scattered light selection element positioned between the reference detector and the flow cell. In embodiments, the non-scattered light selection element is configured to allow only non-scattered light to reach the reference detector. As such, in some embodiments, laser assessors lack an element configured to block or absorb non-scattered light such as, for example, an obfuscation bar or an obstruction bar, e.g., as shown in FIGS. 3, 4 and 5 described above. In some embodiments, the non-scattered light selection element is configured to block particle modulated light from reaching the reference detector with, e.g., a beam bar, disk, density filter, or absorber. In other embodiments, the particle-modulated light is reflected (e.g., by a mirror). In further embodiments, the non-scattered light selection element is a mirror configured such that non-scattered light is permitted to illuminate the reference detector while forward scattered light is reflected to a forward scatter detector. In some embodiments, the mirror includes a passage configured to allow non-scattered laser light from the flow cell to pass through to the reference detector. In certain embodiments, the passage may include a hole that is substantially circular in shape. In embodiments, the passage has a diameter ranging from greater than 0 microns($\mu$) to 3000 $\mu$m, such as greater than 0 $\mu$m to 1000 $\mu$m, and including 0.1 $\mu$m to 100 $\mu$m. As such, in certain embodiments, the core region has a diameter of or about 250$\mu$, of or about 500$\mu$, of or about 1000$\mu$, of or about 1250$\mu$, of or about 1500$\mu$, of or about 1750$\mu$, of or about 2000$\mu$, of or about 2250$\mu$, of or about 2500$\mu$, of or about 2750$\mu$, of or about 3000$\mu$, or anywhere in between.

Where the non-scattered light selection element includes a mirror, such may be positioned any suitable distance from the flow cell, such as where the mirror and the flow cell are separated by a distance ranging from greater than 0 mm to 40 mm, such as 10 mm to 20 mm or 20 mm to 30 mm. As such, in certain embodiments, mirror and the flow cell are separated by a distance such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 30 mm or more.

Similarly, the mirror may be positioned any suitable distance from the reference detector, such as where the mirror and the reference detector are separated by a distance ranging from greater than 0 mm to 40 mm, 10 mm to 20 mm or 20 mm to 30 mm. In certain embodiments, the mirror and the reference detector are separated by a distance such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 30 mm or more.

In certain embodiments, the flow cytometers further include a light dispersion (or separator) module that processes light before it is transmitted to the reference detector. A light dispersion/separator module refers to a device that separates polychromatic light into its component wavelengths (as such, these modules are sometimes referred to as "wavelength separators"). Wavelength separation, according to certain embodiments, may include selectively passing or blocking specific wavelengths or wavelength ranges of the polychromatic light. Light dispersion devices of interest include but are not limited to, colored glass, bandpass filters, interference filters, dichroic mirrors, diffraction gratings, monochromators and combinations thereof, among other wavelength separating devices. In some embodiments, a bandpass filter is positioned between the mirror and the reference detector. In other embodiments, more than one bandpass filter is positioned between the mirror and the reference detector, such as, for example, 2 or more, 3 or more, 4 or more, and including 5 or more. In embodiments, the bandpass filters may have a minimum bandwidths ranging from 2 nm to 100 nm, such as from 3 nm to 95 nm, such as from 5 nm to 95 nm, such as from 10 nm to 90 nm, such as from 12 nm to 85 nm, such as from 15 nm to 80 nm and including bandpass filters having minimum bandwidths ranging from 20 nm to 50 nm.

Figure 6:
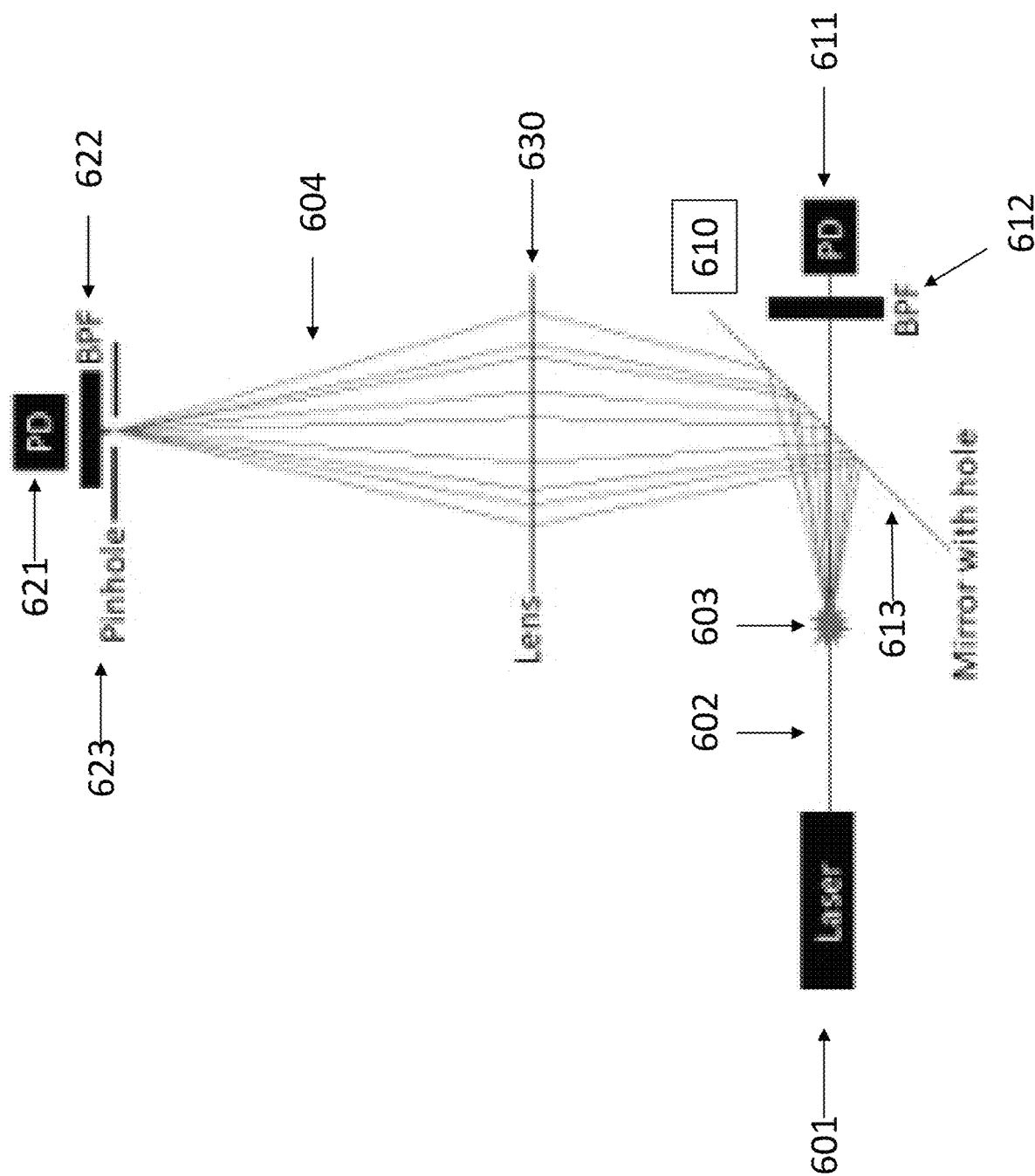
FIG. 6 depicts a two-dimensional schematic drawing of a laser assessor according to certain embodiments.

FIG. 6 depicts a schematic representation of a laser assessor according to certain embodiments. A laser 601 emits a beam of light 602 that irradiates particles in a flow cell at the interrogation point 603. A laser assessor 610 includes a reference detector 611 and a non-scattered light selection element in the form of a mirror 613 positioned between the reference detector 611 and the flow cell. The non-scattered light selection element 613 includes a hole (not shown) configured to allow non-scattered laser light to pass therethrough. The laser assessor also includes a bandpass filter 612 configured to allow non-scattered light with certain wavelengths to reach the reference detector 611. In addition, the mirror is configured to reflect forward scattered light 604 to a forward scatter detector 621. Before forward scattered light 604 reaches the forward scatter detector, it is collected by a lens 630 and passes through a pinhole 623 and bandpass filter 622.

Figure 7:
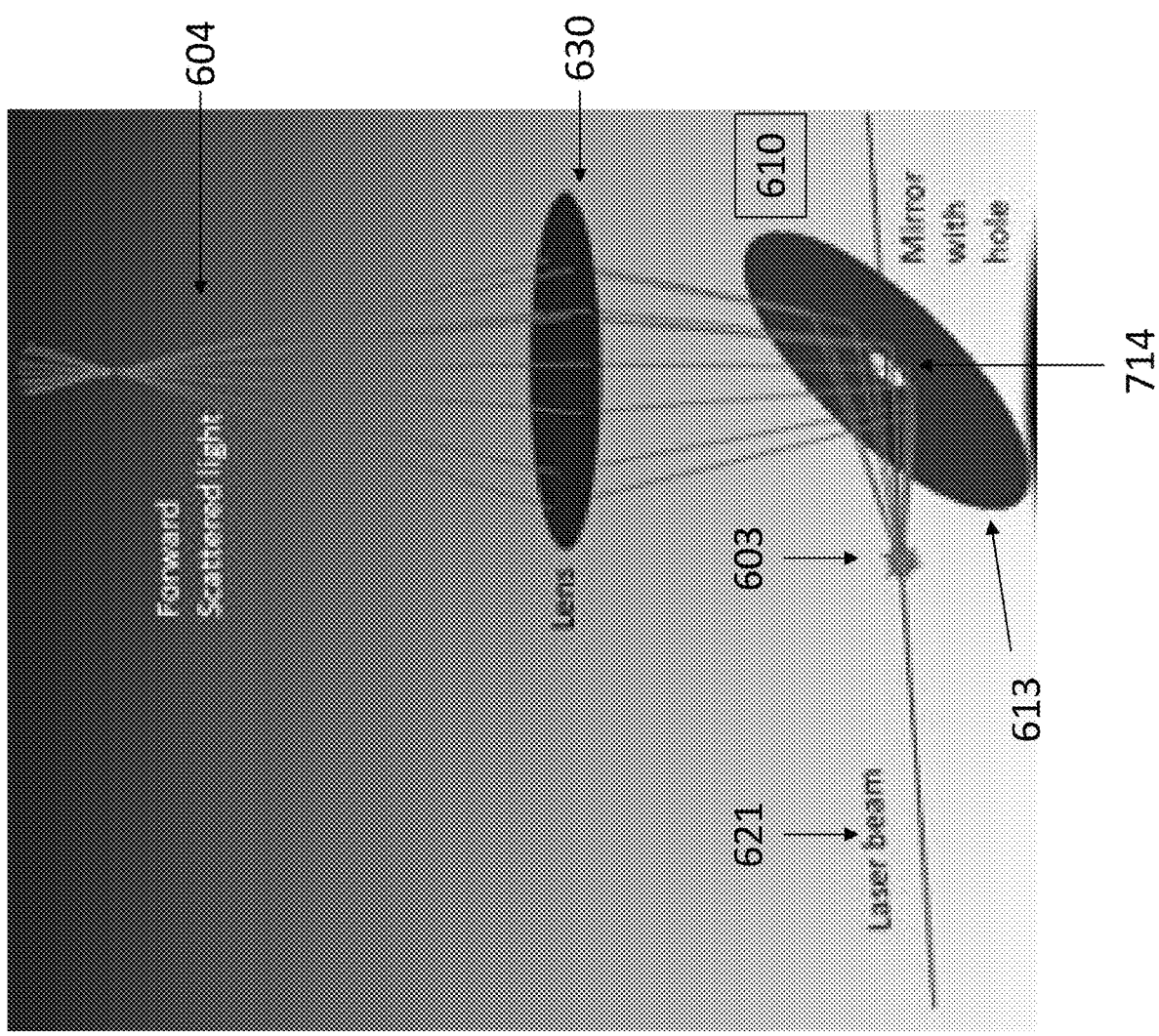
FIG. 7 depicts a three-dimensional schematic drawing of a laser assessor according to certain embodiments.

FIG. 7 presents a three-dimensional representation of certain components of the laser assessor 610. A laser (not shown) emits a beam of light 621 that irradiates particles in a flow cell at the interrogation point 603. The non-scattered light selection element in the form of a mirror 613 includes a circular passage 714 (i.e., hole) configured to allow non-scattered laser light to pass therethrough to a reference detector (not shown). The non-scattered light selection element 613 reflects forward scattered light 604, which is then collected by a lens 630 before it is relayed to a forward scatter detector (not shown).

One of skill in the art will recognize that a laser assessor in accordance with an embodiment of the present invention is not limited to the laser assessors depicted in FIG. 6 and FIG. 7. For example, laser assessors may include any number of lenses, mirrors, pinholes, slits, and bandpass filters in various different configurations that can be arranged as desired.

The reference signal from the laser assessor, in addition to being employed to evaluate functional aspects of the laser, e.g., as described above, may be employed, in some instances, to dynamically adjust flow cytometer data. By "flow cytometer data" it is meant information regarding parameters of the particles in the flow cell that is collected by any number of detectors in the flow cytometer. In embodiments, the flow cytometer data is received from a forward scatter detector. A forward scatter detector may, in some instances, yield information regarding the overall size of a particle. In embodiments, the flow cytometer data is received from a side scatter detector. A side scatter detector may, in some instances, be configured to detect refracted and reflected light from the surfaces and internal structures of the particle, which tends to increase with increasing particle complexity of structure. In embodiments, the flow cytometer data is received from a fluorescent light detector. A fluorescent light detector may, in some instances, be configured to detect fluorescence emissions from fluorescent molecules, e.g., labeled specific binding members (such as labeled antibodies that specifically bind to markers of interest) associated with the particle in the flow cell.

By "dynamically adjusting" flow cytometer data, it is meant altering the flow cytometer data over time such that it no longer reflects noise or drift caused by the operational change of the laser. As discussed above, operational change in the laser (e.g., changes in laser light intensity) can cause noise and drift in collected flow cytometer data. Unadjusted flow cytometer data (i.e., flow cytometer data at the point of its collection by one or more detectors) contains signals from both the particles in the flow cell and extraneous signals from fluctuations in laser light intensity. In certain embodiments, a reference signal from the subject laser assessor can be used to dynamically adjust the flow cytometer data to more precisely ascertain information about the particles in the flow cell, i.e., obtain flow cytometer data that contains minimal potentially misleading or extraneous information. In embodiments, the reference signal, containing information about operational change of the laser, can be employed to identify extraneous signals (e.g., noise, drift) in the flow cytometer data resulting from such operational change of the laser. In embodiments, after extraneous signals have been identified, flow cytometer data can be dynamically adjusted such that it no longer includes those extraneous signals. In some embodiments, dynamically adjusting flow cytometer data includes associating operational change of the laser with the resulting operational change of the particle modulated light. For example, where the flow cytometry data is forward scattered data, dynamically adjusting incudes associating said operational change of the laser with the resulting operational change of the forward scattered light. Where the flow cytometry data is side scattered data, dynamically adjusting incudes associating operational change of the laser with the resulting operational change of the side scattered light. Where the flow cytometry data is fluorescent data, dynamically adjusting incudes associating operational change of the laser with the resulting operational change of the fluorescent light.

For example, effects of operational change on flow cytometer data is described using the analytical equation for Rayleigh scattering for a single particle (Equation 1, website produced by placing "https://en." before "wikipedia.org/wiki/Rayleigh_scattering"):

$$I = I_0 \frac{8\pi^4 \alpha^2}{\lambda^4 R^2}(1 + \cos^2\theta)$$

In Equation 1, I is defined as the intensity of the scattered light as a function of the angle of detection, $I_0$ is defined as the intensity of the laser light, $\pi$ is a mathematical constant, $a$ is the particle properties parameter, $\lambda$ is a wavelength, R is the distance from the particles to the detector, and $\theta$ is the angle of detection. As shown in Equation 1, a detected intensity of forward scattered light I received from a forward scatter detector is linearly dependent on the intensity of the laser light $I_0$. Due to this relationship, changes in values for $I_0$ can become conflated with changes in values for $\alpha$, therefore impeding accurate determination of $\alpha$.

In certain embodiments, flow cytometer data is dynamically adjusted according to Equation 2:

$$\frac{I}{I_0} = \frac{8\pi^4 \alpha^2}{\lambda^4 R^2}(1 + \cos^2\theta)$$

In Equation 2, I and $I_0$ are combined in a ratio such that changes in laser light intensity are associated with resulting changes in scattered light intensity. Changes in this ratio are then compared to changes in the particle properties parameter. Therefore, a fluctuation in laser light intensity is properly identified, and the particle properties parameter is adjusted accordingly. In some embodiments, dynamically adjusting flow cytometer data includes altering fluorescent light data according to the ratio of the intensity of the fluorescent light and the intensity of the laser light. In some embodiments, dynamically adjusting flow cytometer data includes altering side scattered light data according to the ratio of the intensity of the side scattered light and the intensity of the laser light.

Flow Cytometers Including Laser Assessors

Aspects of the present disclosure also include flow cytometers that include laser assessors, e.g., as described above. In certain embodiments, the subject flow cytometers have a flow cell, and a laser configured to irradiate particles in the flow cell.

In embodiments, the laser may be any convenient laser, such as a continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject flow cytometers include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject flow cytometers include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

Laser light sources according to certain embodiments may also include one or more optical adjustment components. The term "optical adjustment" is used herein in its conventional sense to refer to any device that is capable of changing the spatial width of irradiation or some other characteristic of irradiation from the light source, such as for example, irradiation direction, wavelength, beam width, beam intensity and focal spot. Optical adjustment protocols may include any convenient device which adjusts one or more characteristics of the light source, including but not limited to lenses, mirrors, filters, fiber optics, wavelength separators, pinholes, slits, collimating protocols and combinations thereof. In certain embodiments, flow cytometers of interest include one or more focusing lenses. The focusing lens, in one example, may be a de-magnifying lens. In still other embodiments, flow cytometers of interest include fiber optics.

Where the optical adjustment component is configured to move, the optical adjustment component may be configured to be moved continuously or in discrete intervals, such as for example in 0.01μ or greater increments, such as 0.05μ or greater, such as 0.1μ or greater, such as 0.5μ or greater such as 1μ or greater, such as 10μ or greater, such as 100μ or greater, such as 500μ or greater, such as 1 mm or greater, such as 5 mm or greater, such as 10 mm or greater and including 25 mm or greater increments.

Any displacement protocol may be employed to move the optical adjustment component structures, such as coupled to a moveable support stage or directly with a motor actuated translation stage, leadscrew translation assembly, geared translation device, such as those employing a stepper motor, servo motor, brushless electric motor, brushed DC motor, micro-step drive motor, high resolution stepper motor, among other types of motors.

The laser may be positioned any suitable distance from the reference detector, such as where the light source and the detector are separated by 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, the light source may be positioned at any suitable angle to the reference detector, such as at an angle ranging from 10° to 90°, such as from 15° to 85°, such as from 20° to 80°, such as from 25° to 75° and including from 30° to 60°, for example at a 90° angle.

In some instances, a flow cytometer may have any number of lasers, beam splitters, filters, and detectors at various wavelengths and in various different configurations. For example, where flow cytometers include two or more lasers, each laser may be assessed by a single laser assessor. In alternative embodiments, flow cytometers include multiple laser assessors such that each laser may be assessed by its own laser assessor.

Where more than one laser is employed, the sample may be irradiated with the lasers simultaneously or sequentially, or a combination thereof. For example, the sample may be simultaneously irradiated with each of the lasers. In other embodiments, the flow stream is sequentially irradiated with each of the lasers. Where more than one light source is employed to irradiate the sample sequentially, the time each light source irradiates the sample may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the sample with the light source (e.g. laser) for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where sample is sequentially irradiated with two or more light sources, the duration sample is irradiated by each light source may be the same or different.

The time period between irradiation by each light source may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each light source is 10 microseconds. In embodiments where sample is sequentially irradiated by more than two (i.e., 3 or more) light sources, the delay between irradiation by each light source may be the same or different.

The sample may be irradiated continuously or in discrete intervals. In some instances, methods include irradiating the sample in the flow cell with the light source continuously. In other instances, the sample in is irradiated with the light source in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the light source, the sample may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

Aspects of the invention also include a forward scatter detector configured to detect the forward scattered light reflected by the mirror. The number of forward scatter detectors in the subject flow cytometers may vary, as desired. For example, the subject flow cytometers may include 1 forward scatter detector or multiple forward scatter detectors, such as 2 or more, such as 3 or more, such as 4 or more, and including 5 or more. In certain embodiments, flow cytometers include 1 forward scatter detector. In other embodiments, flow cytometers include 2 forward scatter detectors.

Any convenient detector for detecting collected light may be used in the forward scatter detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 $cm^2$ to 10 $cm^2$, such as from 0.05 $cm^2$ to 9 $cm^2$, such as from, such as from 0.1 cm² to 8 cm², such as from 0.5 cm² to 7 cm² and including from 1 cm² to 5 cm².

Where the subject flow cytometers include multiple forward scatter detectors, each detector may be the same, or the collection of detectors may be a combination of different types of detectors. For example, where the subject flow cytometers include two forward scatter detectors, in some embodiments the first forward scatter detector is a CCD-type device and the second forward scatter detector (or imaging sensor) is a CMOS-type device. In other embodiments, both the first and second forward scatter detectors are CCD-type devices. In yet other embodiments, both the first and second forward scatter detectors are CMOS-type devices. In still other embodiments, the first forward scatter detector is a CCD-type device and the second forward scatter detector is a photomultiplier tube (PMT). In still other embodiments, the first forward scatter detector is a CMOS-type device and the second forward scatter detector is a photomultiplier tube. In yet other embodiments, both the first and second forward scatter detectors are photomultiplier tubes.

In embodiments, the forward scatter detector is configured to measure light continuously or in discrete intervals. In some instances, detectors of interest are configured to take measurements of the collected light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Embodiments of the invention also include a light dispersion/separator module positioned between the mirror and the forward scatter detector. Light dispersion devices of interest include but are not limited to, colored glass, bandpass filters, interference filters, dichroic mirrors, diffraction gratings, monochromators and combinations thereof, among other wavelength separating devices. In some embodiments, a bandpass filter is positioned between the mirror and the forward scatter detector. In other embodiments, more than one bandpass filter is positioned between the mirror and the forward scatter detector, such as, for example, 2 or more, 3 or more, 4 or more, and including 5 or more. In embodiments, the bandpass filters have a minimum bandwidths ranging from 2 nm to 100 nm, such as from 3 nm to 95 nm, such as from 5 nm to 95 nm, such as from 10 nm to 90 nm, such as from 12 nm to 85 nm, such as from 15 nm to 80 nm and including bandpass filters having minimum bandwidths ranging from 20 nm to 50 nm. In other embodiments, the laser assessor includes mirror configured as a dichroic mirror. For example, the mirror can include a coating that absorbs light with certain wavelengths and reflects light with other wavelengths to the forward scatter detector.

Certain embodiments of the invention include a side scatter detector configured to detect side scatter wavelengths of light (e.g., light refracted and reflected from the surfaces and internal structures of the particle). In other embodiments, flow cytometers include multiple side scatter detectors, such as 2 or more, such as 3 or more, such as 4 or more, and including 5 or more.

Any convenient detector for detecting collected light may be used in the side scatter detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 cm² to 10 cm², such as from 0.05 cm² to 9 cm², such as from, such as from 0.1 cm² to 8 cm², such as from 0.5 cm² to 7 cm² and including from 1 cm² to 5 cm².

Where the subject flow cytometers include multiple side scatter detectors, each side scatter detector may be the same, or the collection of side scatter detectors may be a combination of different types of detectors. For example, where the subject flow cytometers include two side scatter detectors, in some embodiments the first side scatter detector is a CCD-type device and the second side scatter detector (or imaging sensor) is a CMOS-type device. In other embodiments, both the first and second side scatter detectors are CCD-type devices. In yet other embodiments, both the first and second side scatter detectors are CMOS-type devices. In still other embodiments, the first side scatter detector is a CCD-type device and the second side scatter detector is a photomultiplier tube (PMT). In still other embodiments, the first side scatter detector is a CMOS-type device and the second side scatter detector is a photomultiplier tube. In yet other embodiments, both the first and second side scatter detectors are photomultiplier tubes.

Embodiments of the invention also include a light dispersion/separator module positioned between the flow cell and the side scatter detector. Light dispersion devices of interest include but are not limited to, colored glass, bandpass filters, interference filters, dichroic mirrors, diffraction gratings, monochromators and combinations thereof, among other wavelength separating devices. In some embodiments, a bandpass filter is positioned between the mirror and the side scatter detector. In other embodiments, more than one bandpass filter is positioned between the mirror and the side scatter detector, such as, for example, 2 or more, 3 or more, 4 or more, and including 5 or more.

In embodiments, the subject flow cytometers also include a fluorescent light detector configured to detect one or more fluorescent wavelengths of light. In other embodiments, flow cytometers include multiple fluorescent light detectors such as 2 or more, such as 3 or more, such as 4 or more, 5 or more and including 6 or more.

Any convenient detector for detecting collected light may be used in the fluorescent light detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 cm$^2$ to 10 cm$^2$, such as from 0.05 cm$^2$ to 9 cm$^2$, such as from, such as from 0.1 cm$^2$ to 8 cm$^2$, such as from 0.5 cm$^2$ to 7 cm$^2$ and including from 1 cm$^2$ to 5 cm$^2$.

Where the subject flow cytometers include multiple fluorescent light detectors, each fluorescent light detector may be the same, or the collection of fluorescent light detectors may be a combination of different types of detectors. For example, where the subject flow cytometers include two fluorescent light detectors, in some embodiments the first fluorescent light detector is a CCD-type device and the second fluorescent light detector (or imaging sensor) is a CMOS-type device. In other embodiments, both the first and second fluorescent light detectors are CCD-type devices. In yet other embodiments, both the first and second fluorescent light detectors are CMOS-type devices. In still other embodiments, the first fluorescent light detector is a CCD-type device and the second fluorescent light detector is a photomultiplier tube (PMT). In still other embodiments, the first fluorescent light detector is a CMOS-type device and the second fluorescent light detector is a photomultiplier tube. In yet other embodiments, both the first and second fluorescent light detectors are photomultiplier tubes.

Embodiments of the invention also include a light dispersion/separator module positioned between the flow cell and the fluorescent light detector. Light dispersion devices of interest include but are not limited to, colored glass, bandpass filters, interference filters, dichroic mirrors, diffraction gratings, monochromators and combinations thereof, among other wavelength separating devices. In some embodiments, a bandpass filter is positioned between the mirror and the fluorescent light detector. In other embodiments, more than one bandpass filter is positioned between the mirror and the fluorescent light detector, such as, for example, 2 or more, 3 or more, 4 or more, and including 5 or more.

In embodiments of the present disclosure, fluorescent light detectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths. In some embodiments, 2 or more detectors in a flow cytometer as described herein are configured to measure the same or overlapping wavelengths of collected light.

In some embodiments, fluorescent light detectors of interest are configured to measure collected light over a range of wavelengths (e.g., 200 nm-1000 nm). In certain embodiments, detectors of interest are configured to collect spectra of light over a range of wavelengths. For example, flow cytometers may include one or more detectors configured to collect spectra of light over one or more of the wavelength ranges of 200 nm-1000 nm. In yet other embodiments, detectors of interest are configured to measure light emitted by a sample in the flow stream at one or more specific wavelengths. For example, flow cytometers may include one or more detectors configured to measure light at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, one or more detectors may be configured to be paired with specific fluorophores, such as those used with the sample in a fluorescence assay.

In certain embodiments, the subject flow cytometers include an excitation module that uses radio-frequency multiplexed excitation to generate a plurality of frequency shifted beams of light. In certain instances, the subject flow cytometers are flow cytometric systems as described in U.S. Pat. Nos. 9,423,353 and 9,784,661 and U.S. Patent Publication Nos. 2017/0133857 and 2017/0350803, the disclosures of which are herein incorporated by reference.

In embodiments, flow cytometers also include a processor having memory operably coupled to the processor wherein the memory includes instructions stored thereon, which when executed by the processor, cause the processor to dynamically adjust the flow cytometer data by associating operational change of the laser by associating said operational change with the resulting operational change of the scattered light, e.g., as described above. In some embodiments, the processor is configured to receive a value for laser light intensity from the laser assessor, a value for forward scattered light intensity from the forward scatter detector, and flow cytometer data from one or more detectors. Based on one or more of the flow cytometer data, forward scattered light intensity and the comparison between the forward scattered light intensity and the light intensity of the light source, flow cytometers of interest include memory having instructions for calculating a parameter of the particles in the flow cell. For example, the flow cytometer data may include a particle properties parameter ($\alpha$) that contains information about the particles in the flow cell, such as, for instance, refractive index and diameter. In embodiments, the flow cytometer data is received from a fluorescent light detector. In embodiments, the flow cytometer data is received from a side scatter detector. In embodiments, the flow cytometer data is received from a forward scatter detector. In certain embodiments, the flow cytometer is received from a combination of fluorescent light detectors, side scatter detectors and forward scatter detectors.

Figure 8:
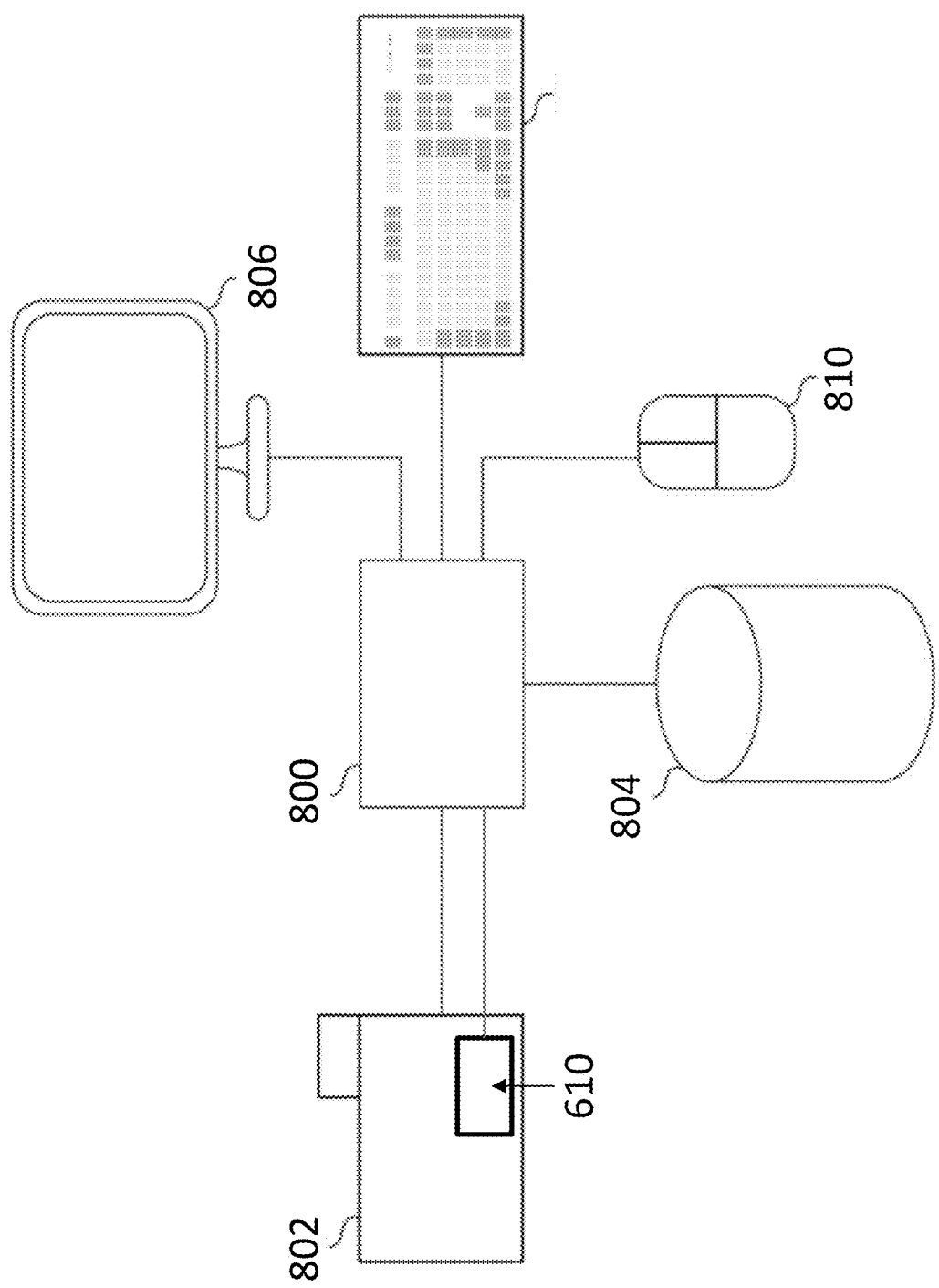
FIG. 8 depicts a functional block diagram for one example of a laser assessor and processor according to certain embodiments.

FIG. 8 shows a functional block diagram for one example of a flow cytometer including a laser assessor, and a processor for dynamically adjusting flow cytometer data. For example, flow cytometer 802 can be configured to acquire flow cytometer data, as described above. A flow cytometer can generate forward scattered light data from a forward scatter detector, side scattered light data from a side scatter detector and fluorescent light data from a fluorescent light detector. The flow cytometer 802 also includes a laser assessor 610. As discussed previously, the laser assessor includes a reference detector configured to selectively detect non-scattered light and return a reference signal including information about laser functionality such as laser light intensity and fluctuations therein.

Both the flow cytometer 802 and the laser assessor 610 included therein can be configured to provide data to the processor 800. For example, a data communication channel can be included between the flow cytometer 802 and the processor 800. Flow cytometer data can be provided from the flow cytometer 802 to the processor 800 via the data communication channel. In addition, a data communication channel can be provided between the laser assessor 610 and the processor 800. A reference signal can be provided from reference detector of the laser assessor 610 to the processor 800 via the data communication channel.

As described above, the processor 800 can be configured dynamically adjust flow cytometer data provided from the flow cytometer 802 based on the reference signal from the laser assessor 610. For example, processor 800 can be operatively connected to a memory device 804, wherein the memory includes instructions stored thereon, which when executed by the processor, cause the processor to dynamically adjust the flow cytometer data by associating operational change of the laser with the resulting operational change of the scattered light. The processor 800 can be configured to provide a graphical display of flow cytometer data, laser reference data, and dynamically adjusted flow cytometer data to a display device 806. The processor 800 can be further configured to render particle parameters or saturated detector data. The display device 806 can be implemented as a monitor, a tablet computer, a smartphone, or other electronic device configured to present graphical interfaces. The display data can comprise plots of biological event data and gates outlining sections of the plots. The display device 806 can be further configured to alter the information presented according to input received from the processor 800 in conjunction with input from the particle analyzer 802, the storage device 804, the keyboard 808, and/or the mouse 810. For example, the processor 800 can be configured to receive a signal from a first input device. For example, the first input device can be implemented as a mouse 810. The mouse 810 can initiate signal to cause the processor 800 to alter the manner in which the data is displayed, which portions of the data is actually displayed on the display device 806, and/or provide input to further processing such as selection of a population of interest for particle sorting. In some implementations, the first device can be implemented as the keyboard 808 or other means for providing an input signal to the processor 800 such as a touchscreen, a stylus, an optical detector, or a voice recognition system. Some input devices can include multiple inputting functions. In such implementations, the inputting functions can each be considered an input device. For example, as shown in FIG. 8, the mouse 810 can include a right mouse button and a left mouse button, each of which can generate a triggering event.

Memory device 804 can also be configured to receive and store flow cytometer data, laser reference data, and dynamically adjusted flow cytometer data from the processor 800. The storage device 804 can be further configured to allow retrieval of flow cytometer data, laser reference data, and dynamically adjusted flow cytometer data by the processor 800.

In some implementations, the processor can generate a user interface to receive example events for sorting. For example, the user interface can include a control for receiving example events or example images. The example events or images or an example gate can be provided prior to collection of event data for a sample, or based on an initial set of events for a portion of the sample.

In certain embodiments, the subject flow cytometers also employ flow cell nozzles and optics subsystems for detecting light emitted by a sample in a flow stream. Suitable flow cytometer systems and methods for analyzing samples include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem.* January; 49(pt 1):17-28; Linden, et. al., *Semin Throm Hemost.* 2004 October; 30(5):502-11; Alison, et al. *J Pathol*, 2010 December; 222(4):335-344; and Herbig, et al. (2007) *Crit Rev Ther Drug Carrier Syst.* 24(3):203-255; the disclosures of which are incorporated herein by reference. In certain instances, flow cytometry systems of interest include BD Biosciences FACSCanto™ flow cytometer, BD Biosciences FACSVantage™, BD Biosciences FACSort™, BD Biosciences FACSCount™, BD Biosciences FACScan™, and BD Biosciences FACSCalibur™ systems, a BD Biosciences Influx™ cell sorter, BD Biosciences Jazz™ cell sorter and BD Biosciences Aria™ cell sorter or the like.

In certain embodiments, the subject flow cytometers incorporate one or more components of the flow cytometers described in U.S. Pat. Nos. 3,960,449; 4,347,935; 4,667,830; 4,704,891; 4,770,992; 5,030,002; 5,040,890; 5,047,321; 5,245,318; 5,317,162; 5,464,581; 5,483,469; 5,602,039; 5,620,842; 5,627,040; 5,643,796; 5,700,692; 6,372,506; 6,809,804; 6,813,017; 6,821,740; 7,129,505; 7,201,875; 7,544,326; 8,140,300; 8,233,146; 8,753,573; 8,975,595; 9,092,034; 9,095,494 and 9,097,640; the disclosures of which are herein incorporated by reference.

In some embodiments, the subject flow cytometers are particle sorting systems that are configured to sort particles with an enclosed particle sorting module, such as those described in U.S. Patent Publication No. 2017/0299493, filed on Mar. 28, 2017, the disclosure of which is incorporated herein by reference. In certain embodiments, particles (e.g., cells) of the sample are sorted using a sort decision module having a plurality of sort decision units, such as those described in U.S. Provisional Patent Application No. 62/803,264, filed on Feb. 8, 2019, the disclosure of which is incorporated herein by reference. In some embodiments, methods for sorting components of sample include sorting particles (e.g., cells in a biological sample) with a particle sorting module having deflector plates, such as described in U.S. Patent Publication No. 2017/0299493, filed on Mar. 28, 2017, the disclosure of which is incorporated herein by reference.

One or more components described below for the particle analysis system 900 (FIG. 9) can be used to analyze and characterize particles, with or without physically sorting the particles into collection vessels. For example, particles can be grouped or displayed in a tree that includes at least three groups as described herein, using one or more of the components of the particle analysis system 900.

Figure 9:
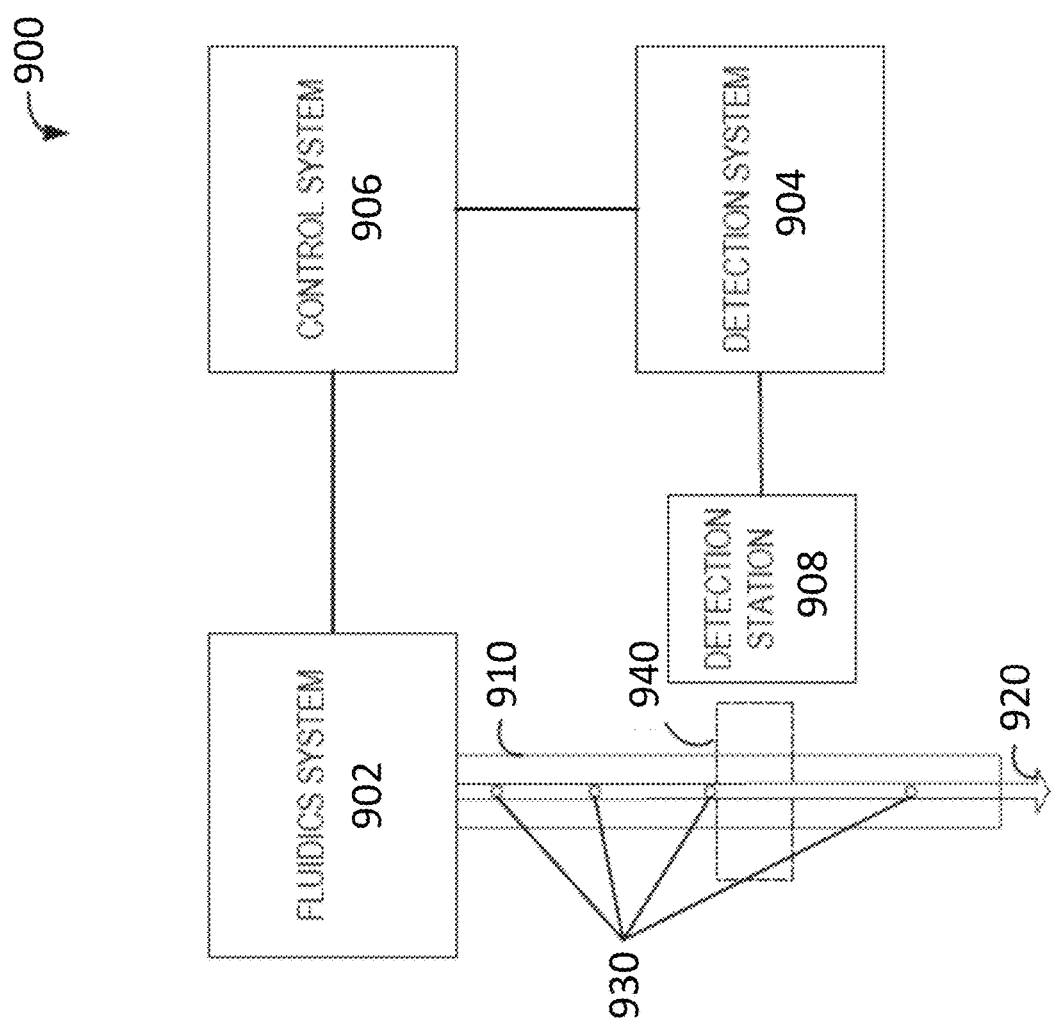
FIG. 9 depicts a functional block diagram of a particle analysis system for computational based sample analysis and particle characterization according to certain embodiments.

FIG. 9 shows a functional block diagram of a particle analysis system for computational based sample analysis and particle characterization. In some embodiments, the particle analysis system 900 is a flow system. The particle analysis system 900 shown in FIG. 9 can be configured to perform, in whole or in part, the methods described herein. The particle analysis system 900 includes a fluidics system 902. The fluidics system 902 can include or be coupled with a sample tube 910 and a moving fluid column within the sample tube in which particles 930 (e.g. cells) of a sample move along a common sample path 920.

The particle analysis system 900 includes a detection system 904 configured to collect a signal from each particle as it passes one or more detection stations along the common sample path. A detection station 908 generally refers to a monitored area 940 of the common sample path. Detection can, in some implementations, include detecting light or one or more other properties of the particles 930 as they pass through a monitored area 940. In FIG. 9, one detection station 908 with one monitored area 940 is shown. Some implementations of the particle analysis system 900 can include multiple detection stations. Furthermore, some detection stations can monitor more than one area.

Each signal is assigned a signal value to form a data point for each particle. As described above, this data can be referred to as event data. The data point can be a multidimensional data point including values for respective properties measured for a particle. The detection system 904 is configured to collect a succession of such data points in a first time interval.

Figure 10:
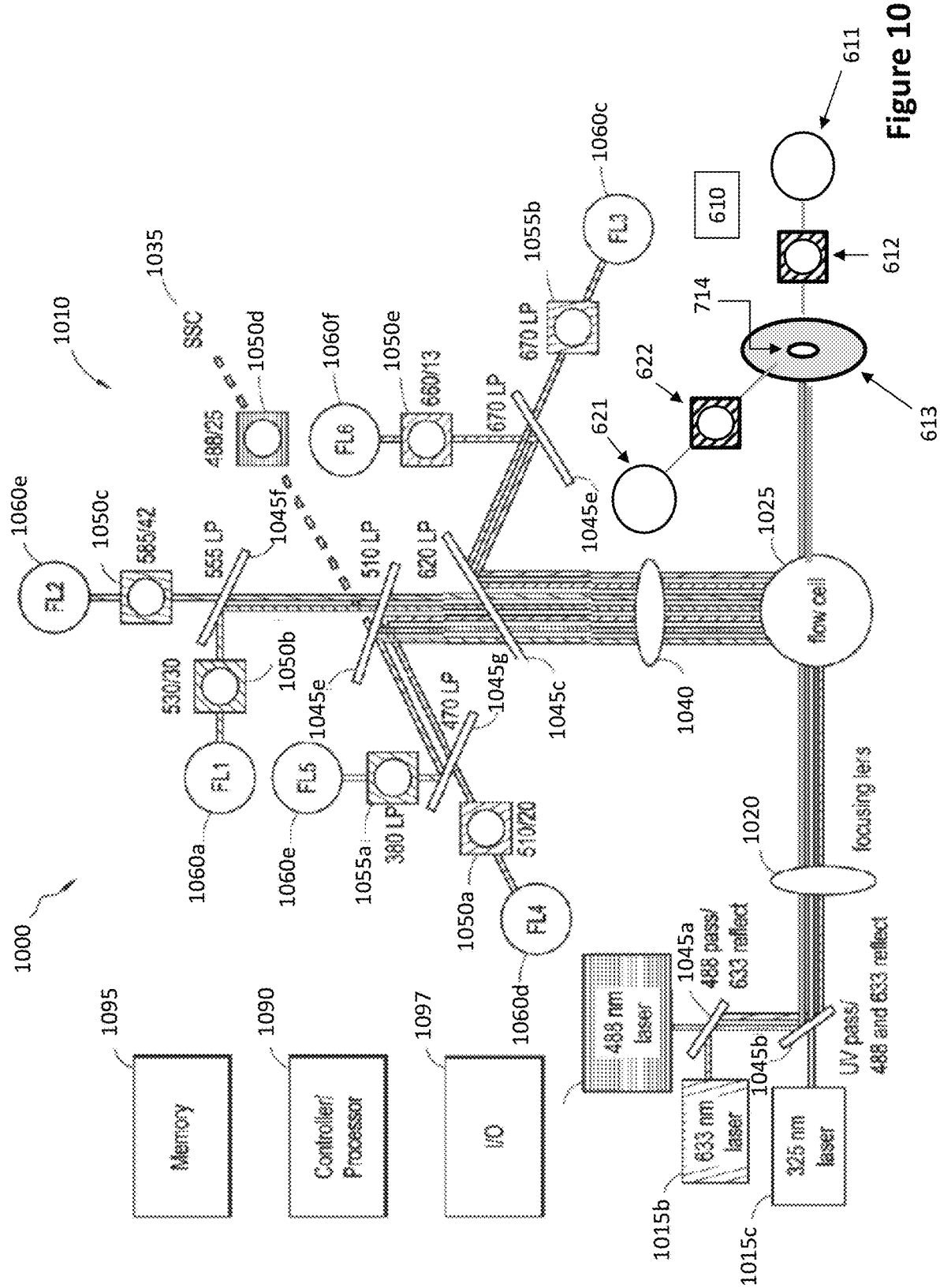
FIG. 10 depicts a flow cytometer including a laser assessor according to certain embodiments.

FIG. 10 shows a system 1000 for flow cytometry in accordance with an illustrative embodiment of the present invention. The system 1000 includes a flow cytometer 1010, a laser assessor 610, a controller/processor 1090 and a memory 1095. The flow cytometer 1010 includes one or more excitation lasers 1015a-1015c, a focusing lens 1020, a flow chamber 1025, a forward scatter detector 611, a side scatter detector 1035, a fluorescence collection lens 1040, one or more beam splitters 1045a-1045g, one or more bandpass filters 1050a-1050e, one or more longpass ("LP") filters 1055a-1055b, and one or more fluorescent light detectors 1060a-1060f.

The excitation lasers 1015a-c emit light in the form of a laser beam. The wavelengths of the laser beams emitted from excitation lasers 1015a-1015c are 488 nm, 633 nm, and 325 nm, respectively, in the example system of FIG. 10. The laser beams are first directed through one or more of beam splitters 1045a and 1045b. Beam splitter 1045a transmits light at 488 nm and reflects light at 633 nm. Beam splitter 1045b transmits UV light (light with a wavelength in the range of 10 to 400 nm) and reflects light at 488 nm and 633 nm.

The laser beams are then directed to a focusing lens 1020, which focuses the beams onto the portion of a fluid stream where particles of a sample are located, within the flow chamber 1025. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the laser assessor 610 and forward scatter detector 621, side scatter detector 1035, and the one or more fluorescent light detectors 1060a-1060f through one or more of the beam splitters 1045a-1045g, the bandpass filters 1050a-1050e, the longpass filters 1055a-1055b, and the fluorescence collection lens 1040.

Laser assessor 610 includes a reference detector 611 and a mirror 613 positioned between the reference detector 611 and the flow cell 1025. The mirror 613 includes a hole 714 configured to allow non-scattered laser light to pass therethrough. The laser assessor also includes a bandpass filter 612 configured to allow non-scattered light with certain wavelengths to reach the reference detector 611. In addition, the mirror is configured to reflect forward scattered light 604 to a forward scatter detector 621. Before forward scattered light 604 reaches the forward scatter detector, it passes through bandpass filter 622.

The fluorescence collection lens 1040 collects light emitted from the particle-laser beam interaction and routes that light towards one or more beam splitters and filters. Bandpass filters, such as bandpass filters 1050a-1050e, allow a narrow range of wavelengths to pass through the filter. For example, bandpass filter 1050a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 1055a-1055b, transmit wavelengths of light equal to or longer than a specified wavelength of light. For example, longpass filter 1055a, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

Beam splitters direct light of different wavelengths in different directions. Beam splitters can be characterized by filter properties such as shortpass and longpass. For example, beam splitter 10105g is a 620 SP beam splitter, meaning that the beam splitter 1045g transmits wavelengths of light that are 620 nm or shorter and reflects wavelengths of light that are longer than 620 nm in a different direction. In one embodiment, the beam splitters 1045a-1045g can comprise optical mirrors, such as dichroic mirrors.

The forward scatter detector 611 is positioned off axis from the direct beam through the flow cell and is configured to detect diffracted light, the excitation light that travels through or around the particle in mostly a forward direction. The intensity of the light detected by the forward scatter detector is dependent on the overall size of the particle. The forward scatter detector can include a photodiode. The side scatter detector 1035 is configured to detect refracted and reflected light from the surfaces and internal structures of the particle, and tends to increase with increasing particle complexity of structure. The fluorescence emissions from fluorescent molecules associated with the particle can be detected by the one or more fluorescent light detectors 1060a-1060f. The side scatter detector 1035 and fluorescent light detectors can include photomultiplier tubes. The signals detected at the forward scatter detector 611, the side scatter detector 1035 and the fluorescent detectors can be converted to electronic signals (voltages) by the detectors. This data can provide information about the sample.

In operation, cytometer operation is controlled by a controller/processor 1090, and the measurement data from the detectors can be stored in the memory 1095 and processed by the controller/processor 1090. Although not shown explicitly, the controller/processor 190 is coupled to the detectors to receive the output signals therefrom, and may also be coupled to electrical and electromechanical components of the flow cytometer 1000 to control the lasers, fluid flow parameters, and the like. Input/output (I/O) capabilities 1097 may be provided also in the system. The memory 1095, controller/processor 1090, and I/O 1097 may be entirely provided as an integral part of the flow cytometer 1010. In such an embodiment, a display may also form part of the I/O capabilities 1097 for presenting experimental data to users of the cytometer 1000. Alternatively, some or all of the memory 1095 and controller/processor 1090 and I/O capabilities may be part of one or more external devices such as a general purpose computer. In some embodiments, some or all of the memory 1095 and controller/processor 1090 can be in wireless or wired communication with the cytometer 1010. The controller/processor 1090 in conjunction with the memory 1095 and the I/O 1097 can be configured to perform various functions related to the preparation and analysis of a flow cytometer experiment.

The system illustrated in FIG. 10 includes six different detectors that detect fluorescent light in six different wavelength bands (which may be referred to herein as a "filter window" for a given detector) as defined by the configuration of filters and/or splitters in the beam path from the flow cell 1025 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. However, as more detectors are provided, and more labels are utilized, perfect correspondence between filter windows and fluorescent emission spectra is not possible. It is generally true that although the peak of the emission spectra of a particular fluorescent molecule may lie within the filter window of one particular detector, some of the emission spectra of that label will also overlap the filter windows of one or more other detectors. This may be referred to as spillover. The I/O 1097 can be configured to receive data regarding a flow cytometer experiment having a panel of fluorescent labels and a plurality of cell populations having a plurality of markers, each cell population having a subset of the plurality of markers. The I/O 1097 can also be configured to receive biological data assigning one or more markers I/O to one or more cell populations, marker density data, emission spectrum data, data assigning labels to one or more markers, and cytometer configuration data. Flow cytometer experiment data, such as label spectral characteristics and flow cytometer configuration data can also be stored in the memory 1095. The controller/processor 1090 can be configured to evaluate one or more assignments of labels to markers.

One of skill in the art will recognize that a flow cytometer in accordance with an embodiment of the present invention is not limited to the flow cytometer depicted in FIG. 10, but can include any flow cytometer known in the art. For example, a flow cytometer may have any number of lasers, beam splitters, filters, and detectors at various wavelengths and in various different configurations.

Methods for Dynamically Adjusting Flow Cytometer Data

Aspects of the present disclosure include methods for assessing functionality of flow cytometer lasers, and, when desired, dynamically adjusting flow cytometer data. According to some embodiments, the subject methods include introducing a sample into a flow cytometer that includes a laser, a flow cell, and a laser assessor configured to dynamically assess operational change of the laser.

The sample analyzed can be any sample that is of interest to a user. In certain embodiments, the sample contains a biological component, or is a biological sample. The term "biological sample" is used in its conventional sense to refer to a sample derived from or containing a whole organism, e.g., a prokaryotic cells, eukaryotic cells, plants, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to: a homogenate; isolated, purified or enriched biological particles (e.g., DNA, RNA, proteins, sub-cellular organelles, etc.); and lysates or extracts prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While embodiments of the present disclosure may be applied to samples from a human subject, it is to be understood that the methods may also be carried-out on samples from other animal subjects (that is, in "non-human subjects") such as, but not limited to, birds, mice, rats, dogs, cats, livestock and horses.

In practicing methods according to certain embodiments, a sample (e.g., in a flow stream of a flow cytometer) is irradiated with light from a light source. Any convenient light source may be employed. In some instances, methods include the irradiation of a flow cell with a laser. In certain embodiments, the laser may be any convenient laser, such as a continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, CO2 laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, lasers for practicing the subject methods include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, lasers for practicing the subject methods include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

The sample may be irradiated continuously or in discrete intervals. In some instances, methods include irradiating the sample in the flow cell continuously. In other instances, the sample is irradiated by the laser in discrete intervals, such as irradiating every 0.001 milliseconds, every 0.01 milliseconds, every 0.1 milliseconds, every 1 milliseconds, every 10 milliseconds, every 100 milliseconds, and including every 1000 milliseconds. The sample may be irradiated from a distance which varies such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, the angle of irradiation may vary, ranging from 10° to 90°, such as from 15° to 85°, such as from 20° to 80°, such as from 25° to 75° and including from 30° to 60°, for example at a 90° angle.

In some embodiments, methods are provided for evaluating the functionality of flow cytometer lasers. As discussed above, changes in laser functionality may manifest in a number of different ways, including but not limited to: change in light intensity over time, change from continuous to discontinuous, etc. Where the operational change is a change in intensity over time, the magnitude of change may vary, ranging in some instances from 0.02% to 2%, such as 0.2% to 2%, including 0.2 to 1%, over a period of time ranging from 1 μsec to 10 hours, such as 1 sec to 10 hour, including 1 min to 1 hour, where in some instances the period of time ranges from 1 μsec to 10 μsec, or 1 sec to 1 min, or 10 min to 10 hour. Causes of operational change in the laser include, but are not limited to, laser electronics thermal drift, laser pointing stability drift, thermal expansion coefficients optical mismatch drift, changes in pressure, and changes in humidity.

Laser assessors of interest for the subject methods are configured to assess the operational change of a laser of a flow cytometer by selectively detecting non-scattered light, i.e., laser light that is not modulated by particles in a flow cell after passing therethrough. As discussed above, light from the irradiated sample is dispersed into multiple different channels (e.g., forward scattered light, side scattered light, fluorescent light, non-scattered light). In embodiments, selectively detecting non-scattered light includes preventing channels of particle-modulated light (e.g., forward scattered light) from being detected with the non-scattered light. In embodiments, selectively detecting non-scattered light includes allowing only the non-scattered light to illuminate a detector (i.e., reference detector) configured to produce a signal in response thereto (i.e., reference signal). In embodiments, the reference signal is used to assess the operational change of the laser. In some embodiments, methods include employing the reference signal to calculate values for parameters such as laser intensity and changes in laser intensity, and outputting these values to a user.

In embodiments, the reference detector of interest for practicing the instant methods is configured to measure light continuously or in discrete intervals. In some instances, the reference detector is configured to take measurements of the collected light continuously. In other instances, the reference detector is configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

In certain embodiments, laser assessors of interest for the instant methods further include a non-scattered light selection element positioned between the reference detector and the flow cell. In embodiments, the non-scattered light selection element is configured to allow only non-scattered light to reach the reference detector. In some embodiments, the non-scattered light selection element is configured to block particle modulated light from reaching the reference detector with, e.g., a beam bar, disk, density filter, or absorber. In other embodiments, the particle-modulated light is reflected (e.g., by a mirror). In further embodiments, the non-scattered light selection element includes a mirror configured such that non-scattered light is permitted to illuminate the reference detector while forward scattered light is reflected to a forward scatter detector. In some embodiments, the mirror includes a passage configured to allow non-scattered laser light from the flow cell to pass through to the reference detector.

In embodiments, methods include detecting forward scattered light with a forward scatter detector. The number of forward scatter detectors in the subject methods may vary, as desired. For example, the subject methods may involve 1 forward scatter detector or multiple forward scatter detectors, such as 2 or more, such as 3 or more, such as 4 or more, and including 5 or more. In certain embodiments, methods include 1 forward scatter detector. In other embodiments, methods include 2 forward scatter detectors.

In embodiments, the forward scatter detector is configured to measure light continuously or in discrete intervals. In some instances, detectors of interest are configured to take measurements of the collected light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

The reference signal from the laser assessor, in addition to being employed to evaluate functional aspects of the laser, e.g., as described above, may be employed, in some embodiments of the instant method, to dynamically adjust cytometer data. In embodiments, flow cytometer data is collected by any number of detectors in the flow cytometer. In some embodiments, the flow cytometer data is received from a fluorescent light detector. A fluorescent light detector may, in some instances, be configured to detect fluorescence emissions from fluorescent molecules associated with the particle in the flow cell. In embodiments, the flow cytometer data is received from a side scatter detector. A side scatter detector may, in some instances, be configured to detect refracted and reflected light from the surfaces and internal structures of the particle, which tends to increase with increasing particle complexity of structure. In embodiments, the flow cytometer data is received from a forward scatter detector. A forward scatter detector may, in some instances, yield information regarding the overall size of a particle. In certain embodiments, the flow cytometer is received from a combination of fluorescent light detectors, side scatter detectors and forward scatter detectors.

By "dynamically adjusting" flow cytometer data, it is meant altering the flow cytometer data over time such that it no longer reflects noise or drift caused by the operational change of the laser. As discussed above, operational change in the laser (e.g., changes in laser light intensity) can cause noise and drift in collected flow cytometer data. Unadjusted flow cytometer data (i.e., flow cytometer data at the point of its collection by one or more detectors) contains signals from both the particles in the flow cell and extraneous signals from fluctuations in laser light intensity. In certain embodiments, a reference signal from the subject laser assessor can be used to dynamically adjust the flow cytometer data to more precisely ascertain information about the particles in the flow cell, i.e., obtain flow cytometer data that contains minimal potentially misleading or extraneous information. In embodiments, the reference signal, containing information about operational change of the laser, can be employed to identify extraneous signals (e.g., noise, drift) in the flow cytometer data resulting from such operational change of the laser. In embodiments, after extraneous signals have been identified, flow cytometer data can be dynamically adjusted such that it no longer includes those extraneous signals. In some embodiments, dynamically adjusting flow cytometer data includes associating operational change of the laser with the resulting operational change of the particle modulated light. For example, where the flow cytometry data is forward scattered data, dynamically adjusting incudes associating said operational change of the laser with the resulting operational change of the forward scattered light. Where the flow cytometry data is side scattered data, dynamically adjusting incudes associating said operational change with the resulting operational change of the side scattered light. Where the flow cytometry data is fluorescent data, dynamically adjusting incudes associating said operational change with the resulting operational change of the fluorescent light.

In embodiments, methods include dynamically adjusting the flow cytometer data by associating operational change of the laser with the resulting operational change of the forward scattered light. In some embodiments, methods include receiving a value for laser light intensity from the laser assessor, a value for forward scattered light intensity from the forward scatter detector, and flow cytometer data from one or more detectors. Based on one or more of the flow cytometer data, forward scattered light intensity and the comparison between the forward scattered light intensity and the light intensity of the light source, methods include calculating a parameter of the particles in the flow cell. For instance, the flow cytometer data may include a particle properties parameter ($\alpha$) that contains information about the particles in the flow cell, such as, for instance, refractive index and diameter. In embodiments, the flow cytometer data is received from a fluorescent light detector. In embodiments, the flow cytometer data is received from a side scatter detector. In embodiments, the flow cytometer data is received from a forward scatter detector. In embodiments, the flow cytometer is received from a combination of fluorescent detectors, side scatter detectors and forward scatter detectors.

The effects of changes in laser light intensity on flow cytometer data is described using the analytical equation for Rayleigh scattering for a single particle (Equation 1, http://en.wikipedia.org/wiki/Rayleigh_scattering):

$$I = I_0 \frac{8\pi^4 \alpha^2}{\lambda^4 R^2}(1 + \cos^2 \theta)$$

As described above, I is defined as the intensity of the scattered light as a function of the angle of detection, $I_0$ is defined as the intensity of the laser light, $\pi$ is a mathematical constant, $\alpha$ is the particle properties parameter, -, $\lambda$ is a wavelength, R is the distance from the particles to the detector, and $\theta$ is the angle of detection. As shown in Equation 1, a detected intensity of forward scattered light I received from a forward scatter detector is linearly dependent on the intensity of the laser light $I_0$. Due to this relationship, changes in values for $I_0$ can become conflated with changes in values for $\alpha$, therefore impeding accurate determination of $\alpha$.

Dynamically adjusting flow cytometer data in embodiments of the instant method includes manipulating the particle properties parameter according to Equation 2:

$$\frac{I}{I_0} = \frac{8\pi^4 \alpha^2}{\lambda^4 R^2}(1 + \cos^2 \theta)$$

In Equation 2, I and $I_0$ are combined in a ratio such that changes in laser light intensity are associated with resulting changes in scattered light intensity. Changes in this ratio are then compared to changes in the particle properties parameter. Therefore, a fluctuation in laser light intensity is properly identified, and the processor adjusts the particle properties parameter accordingly. In some embodiments, dynamically adjusting flow cytometer data includes altering fluorescent light data according to the ratio of the intensity of the fluorescent light and the intensity of the laser light. In some embodiments, dynamically adjusting flow cytometer data includes altering side scattered light data according to the ratio of the intensity of the side scattered light and the intensity of the laser light.

Computer-Controlled Systems

Aspects of the present disclosure further include computer-controlled systems, where the systems further include one or more computers for complete automation or partial automation. In some embodiments, systems include a computer having a computer readable storage medium with a computer program stored thereon, where the computer program when loaded on the computer includes instructions for irradiating a flow cell with a laser light source. In some embodiments, the computer program includes instructions for assessing operational change of the laser with a laser assessor. In some embodiments, the program includes instructions for receiving flow cytometer data from one or more photodetectors and laser reference data from a laser assessor configured to dynamically assess operational change of a laser during use. In some embodiments, the program includes instructions for dynamically adjusting the flow cytometer data based on the laser reference data. In some embodiments, dynamically adjusting flow cytometer data includes compensating for optical noise caused by operational change of the laser by associating said operational change with the resulting operational change of the forward scattered light. In some embodiments, the program includes instructions for adjusting a particle properties parameter according to the ratio of the intensity of the forward scattered light and the intensity of the laser light.

In embodiments, the system includes an input module, a processing module and an output module. The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, processors include analog electronics which allows the user to manually align a light source with the flow stream based on the first and second light signals. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smart-phone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows NT®, Windows XP, Windows 7, Windows 8, iOS, Sun Solaris, Linux, OS/400, Compaq Tru64 Unix, SGI IRIX, Siemens Reliant Unix, and others.

Figure 11:
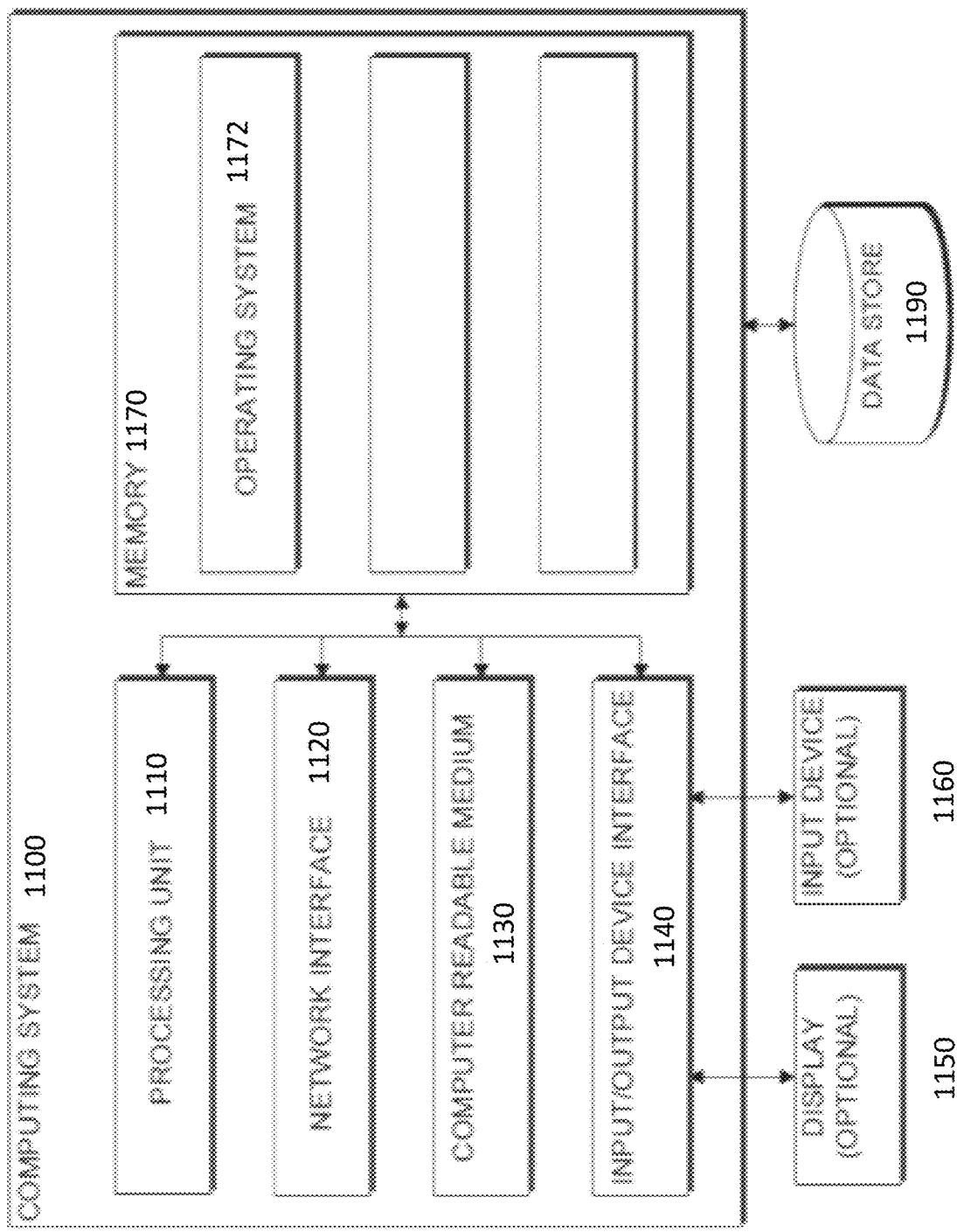
FIG. 11 depicts a block diagram of a computing system according to certain embodiments.

FIG. 11 depicts a general architecture of an example computing device 1100 according to some embodiments. The general architecture of the computing device 1100 depicted in FIG. 11 includes an arrangement of computer hardware and software components. The computing device 1100 may include many more (or fewer) elements than those shown in FIG. 8. It is not necessary, however, that all of these generally conventional elements be shown in order to provide an enabling disclosure. As illustrated, the computing device 1100 includes a processing unit 1110, a network interface 1120, a computer readable medium drive 1130, an input/output device interface 1140, a display 1150, and an input device 1160, all of which may communicate with one another by way of a communication bus. The network interface 1120 may provide connectivity to one or more networks or computing systems. The processing unit 1110 may thus receive information and instructions from other computing systems or services via a network. The processing unit 1110 may also communicate to and from memory 1170 and further provide output information for an optional display 1150 via the input/output device interface 1140. The input/output device interface 1140 may also accept input from the optional input device 1160, such as a keyboard, mouse, digital pen, microphone, touch screen, gesture recognition system, voice recognition system, gamepad, accelerometer, gyroscope, or other input device.

The memory 1170 may contain computer program instructions (grouped as modules or components in some embodiments) that the processing unit 1110 executes in order to implement one or more embodiments. The memory 1170 generally includes RAM, ROM and/or other persistent, auxiliary or non-transitory computer-readable media. The memory 1170 may store an operating system 1172 that provides computer program instructions for use by the processing unit 1110 in the general administration and operation of the computing device 1100. The memory 1170 may further include computer program instructions and other information for implementing aspects of the present disclosure.

Computer-Readable Storage Medium

Aspects of the present disclosure further include non-transitory computer readable storage mediums having instructions for practicing the subject methods. Computer readable storage media may be employed on one or more computers for complete automation or partial automation of a system for practicing methods described herein. In some embodiments, instructions in accordance with the method described herein can be coded onto a computer-readable medium in the form of "programming", where the term "computer readable medium" as used herein refers to any non-transitory storage medium that participates in providing instructions and data to a computer for execution and processing. Examples of suitable non-transitory storage media include a floppy disk, hard disk, optical disk, magneto-optical disk, CD-ROM, CD-R magnetic tape, non-volatile memory card, ROM, DVD-ROM, Blue-ray disk, solid state disk, and network attached storage (NAS), whether or not such devices are internal or external to the computer. A file containing information can be "stored" on computer readable medium, where "storing" means recording information such that it is accessible and retrievable at a later date by a computer. The computer-implemented method described herein can be executed using programming that can be written in one or more of any number of computer programming languages. Such languages include, for example, Java (Sun Microsystems, Inc., Santa Clara, CA), Visual Basic (Microsoft Corp., Redmond, WA), and C++ (AT&T Corp., Bedminster, NJ), as well as any many others.

In some embodiments, computer readable storage media of interest include a computer program stored thereon, where the computer program when loaded on the computer includes instructions having an algorithm for dynamically adjusting flow cytometer data based on laser reference data. In some embodiments, the computer readable storage medium includes algorithm for receiving flow cytometer data from one or more photodetectors and laser reference data from the reference detector of a laser assessor configured to dynamically assess operational change of a laser during use. In embodiments, the flow cytometer data is received from a fluorescent light detector. In embodiments, the flow cytometer data is received from a side scatter detector. In embodiments, the flow cytometer data is received from a forward scatter detector. In embodiments, the flow cytometer is received from a combination of fluorescent detectors, side scatter detectors and forward scatter detectors.

In some embodiments, computer readable storage medium includes algorithm for dynamically adjusting the flow cytometer data based on the laser reference data. In some embodiments, dynamically adjusting flow cytometer data includes compensating for optical noise caused by operational change of the laser by associating said operational change with the resulting operational change of the forward scattered light. In embodiments, the reference signal, containing information about operational change of the laser, can be employed to identify extraneous signals (e.g., noise, drift) in the flow cytometer data resulting from such operational change of the laser. In embodiments, after extraneous signals have been identified, flow cytometer data can be dynamically adjusted such that it no longer includes those extraneous signals. In some embodiments, the non-transitory computer readable storage medium includes algorithm for adjusting a particle properties parameter according to the ratio of the intensity of the forward scattered light and the intensity of the laser light. In some embodiments, the non-transitory computer readable storage medium includes algorithm for adjusting fluorescent light data according to the ratio of the intensity of the fluorescent light and the intensity of the laser light. In some embodiments, the non-transitory computer readable storage medium includes algorithm for adjusting side scattered light data according to the ratio of the intensity of the side scattered light and the intensity of the laser light.

The computer readable storage medium may be employed on more or more computer systems having a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, Python, C++, other high level or low level languages, as well as combinations thereof, as is known in the art. The operating system also provides scheduling, input-output control, file and data management, memory management, and communication control and related services, all in accordance with known techniques.

Utility

The subject devices, methods and computer systems find use in a variety of applications where it is desirable to increase resolution and accuracy in the determination of parameters for particles in a biological sample. For example, the present disclosure finds use in accurately determining parameters such as refractive index, diameter, fluorescence emission, as well as surface and internal structure of the particle. The subject devices, methods and computer systems also find use in reducing or eliminating the effects of optical noise and drift due to fluctuations in laser intensity caused by factors such as temperature, pressure and humidity. For example, the present disclosure finds use in assessing the operational change (e.g., changes in intensity) of the laser, i.e., evaluating the functionality of the laser and determining characteristics of the laser light emanating therefrom. Where it is desired to compensate for optical change in flow cytometer data received from one or more particle-modulated light detectors (e.g., forward scatter detectors, side scatter detectors, fluorescent light detectors), the subject devices, methods and computer systems find use in dynamically adjusting the flow cytometer data based on laser reference data. In embodiments, the present disclosure reduces the need for user input or manual adjustment during sample analysis with a flow cytometer. In some embodiments, the subject methods and systems provide fully automated protocols so that adjustments to flow cytometer data during use require little, if any, human input.

The present disclosure can be employed to characterize many types of analytes, in particular, analytes relevant to medical diagnosis or protocols for caring for a patient, including but not limited to: proteins (including both free proteins and proteins and proteins bound to the surface of a structure, such as a cell), nucleic acids, viral particles, and the like. Further, samples can be from in vitro or in vivo sources, and samples can be diagnostic samples.

Kits

Aspects of the present disclosure further include kits, where kits include a laser assessor as described herein. Laser assessors as described herein are configured to allow for the dynamic assessment of operational change of a flow cytometer laser. In embodiments, laser assessors are configured to detect non-scattered laser light that is not scattered by particles in the flow cell after passing therethrough and produce a reference signal in response thereto. As such, the kits can include one or more mirrors with a passage contained therein, e.g., for reflecting forward scattered light to a forward scattered light detector and allowing non-scattered laser light to pass therethrough. In addition, kits may include one or more reference detectors configured to detect non-scattered laser light. Kits may also include one or more optical adjustment components including, but not limited to, bandpass filters, lenses, pinholes, and slits.

The various components of the kits may be present in separate containers, or some or all of them may be pre-combined/assembled. For example, a laser assessor can be pre-assembled and present in a single sealed package. In some embodiments, a laser assessor is configured to be added on to an existing optical detection system, e.g., a flow cytometer, and as such may include hardware for attaching or inserting the laser assessor.

In addition to the above components, the subject kits may further include (in some embodiments) instructions, e.g., for adding the laser assessor to a flow cytometer or using a flow cytometer having a laser assessor according to aspects of the subject invention. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Although the foregoing invention has been described in some detail by way of illustration and example for purposes of clarity of understanding, it is readily apparent to those of ordinary skill in the art in light of the teachings of this invention that some changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A flow cytometer comprising:
   a flow cell;
   a laser configured to irradiate particles at a given intensity in the flow cell at an interrogation point and thereby produce at least non-scattered light and forward scattered light;
   a forward scattered light detector configured to detect the forward scattered light;
   a reference detector configured to detect the non-scattered light;
   a non-scattered light selection element positioned between the reference detector and the flow cell, wherein the non-scattered light selection element is configured to separate forward scattered light from non-scattered light and to prevent the forward scattered light from being detected by the reference detector; and
   a processor configured to actuate the laser to:
   (a) generate:
      flow cytometer data based on the detected forward scattered light; and
      laser reference data from the detected non-scattered light; and
   (b) dynamically adjust the flow cytometer data based on the laser reference data, wherein dynamically adjusting the flow cytometer data comprises:
      (i) identifying a change in intensity of the laser reference data associated with a resulting change in an intensity of the flow cytometer data by computing a ratio of the intensity of the flow cytometer data to the given intensity of the laser reference data; and
      (ii) removing an optical noise from the flow cytometer data based on the identified change by associating the computed ratio with variations in the irradiated particles.

2. The flow cytometer according to claim 1, wherein the non-scattered light selection element comprises a mirror configured to reflect the forward scattered light, wherein the mirror comprises a passage configured to allow non-scattered laser light from the flow cell to pass through the mirror to the reference detector.

3. The flow cytometer according to claim 2, further comprising a bandpass filter positioned between the non-scattered light selection element and the reference detector.

4. The flow cytometer according to claim 2, wherein the passage has a diameter ranging from greater than 0 µm to 3000 µm.

5. The flow cytometer according to claim 2, wherein the mirror comprises a dichroic mirror.

6. The flow cytometer according to claim 1, wherein the reference detector comprises a photomultiplier tube.

7. The flow cytometer according to claim 1, wherein computing the ratio of the intensity of the flow cytometer data to the given intensity of the laser reference data comprising applying Equation 2:

$$\frac{I}{I_0} = \frac{8\pi^4 \alpha^2}{\lambda^4 R^2}(1 + \cos^2\theta)$$

wherein:
   I is the intensity of the forward scattered light as a function of an angle of detection;
   $I_0$ is the given intensity of the laser light;
   $\pi$ is a mathematical constant;
   $\alpha$ is a particle properties parameter related to a diameter and refractive index of the irradiated particles;
   $\lambda$ is a wavelength;
   r is a distance from the particles to the detector; and
   $\theta$ is the angle of detection.

8. The flow cytometer according to claim 1, wherein:
   the laser and the flow cell are configured to produce side scattered light; and
   the flow cytometer further comprises a side scatter detector configured to detect the side scattered light.

9. The flow cytometer according to claim 1, wherein:
   the laser and the flow cell are configured to produce fluorescent light; and
   the flow cytometer further comprises a fluorescent light detector configured to detect the fluorescent light.

10. The flow cytometer according to claim 2, wherein:
    the non-scattered light selection element is configured to reflect the forward scattered light.

11. The flow cytometer according to claim 10, wherein the forward scattered light detector is configured to detect the forward scattered light reflected by the non-scattered light selection element.

* * * * *